(12) United States Patent
Höglauer et al.

(10) Patent No.: US 9,167,934 B2
(45) Date of Patent: Oct. 27, 2015

(54) BREWING HEAD OF A HOT-BEVERAGE PREPARATION DEVICE, PREPARATION DEVICE HAVING A BREWING HEAD AND OPERATING METHOD FOR SAID PREPARATION DEVICE

(75) Inventors: Michael Höglauer, Unterwössen (DE); Aleksander Sedovsek, Mozirje (SI); Michael Steffl, Marquartstein (DE)

(73) Assignee: BSH Bosch Hausgeraete GmbH, Munich (DE)

( * ) Notice: Subject to any disclaimer, the term of this patent is extended or adjusted under 35 U.S.C. 154(b) by 447 days.

(21) Appl. No.: 13/635,439

(22) PCT Filed: Apr. 1, 2011

(86) PCT No.: PCT/EP2011/055130
§ 371 (c)(1),
(2), (4) Date: Sep. 17, 2012

(87) PCT Pub. No.: WO2011/121125
PCT Pub. Date: Oct. 6, 2011

(65) Prior Publication Data
US 2013/0008316 A1 Jan. 10, 2013

(30) Foreign Application Priority Data
Apr. 1, 2010 (DE) .......................... 10 2010 003 637

(51) Int. Cl.
*A47J 31/06* (2006.01)
*A47J 31/44* (2006.01)
(Continued)

(52) U.S. Cl.
CPC ............ *A47J 31/368* (2013.01); *A47J 31/4407* (2013.01)

(58) Field of Classification Search
CPC . A47J 31/368; A47J 31/4407; A47J 31/3695; A47J 31/0663; A47J 31/0668; A47J 31/0673; A47J 31/0678; A47J 31/3666; A47J 31/3676; A47J 31/3685; A47J 31/369; A47J 31/0642; A47J 31/446; B65D 85/8043
USPC .............................. 99/279–323; 426/431–437
See application file for complete search history.

(56) References Cited

U.S. PATENT DOCUMENTS 2,268,633 A * 1/1942 Aske ................................ 99/281
4,986,171 A * 1/1991 Precht ............................. 99/279
(Continued)

FOREIGN PATENT DOCUMENTS

DE 69210084 T2 9/1996
DE 202008014160 U1 3/2009
(Continued)

OTHER PUBLICATIONS

International Search Report PCT/EP2011/055130.

*Primary Examiner* — Dana Ross
*Assistant Examiner* — Gyounghyun Bae
(74) *Attorney, Agent, or Firm* — Laurence A. Greenberg; Werner H. Sterner; Ralph E. Locher

(57) ABSTRACT

A brewing head of a hot beverage machine includes a fixed brewing chamber part, and a movable brewing chamber part which is movable in relation to the fixed brewing chamber part to define a brewing chamber for receiving a substrate capsule. The fixed and movable brewing chamber parts are closed by a locking system to thereby form the brewing chamber, and a seal is provided for pressure-tight sealing of one of the two brewing chamber parts and the substrate capsule during beverage preparation. The brewing chambers has three operating positions involving an opening position for loading the brewing chamber, a partially closed position in which the brewing chamber is closed and the seal is detensioned, and a closed position in which the brewing chamber is likewise closed and the seal is tensioned.

26 Claims, 15 Drawing Sheets

(51) Int. Cl.
 *A23L 1/20* (2006.01)
 *A23L 1/28* (2006.01)
 *A47J 31/36* (2006.01)

(56) References Cited

U.S. PATENT DOCUMENTS

| | | | |
|---|---|---|---|
| 5,402,707 | A | 4/1995 | Fond et al. |
| 5,921,168 | A * | 7/1999 | Nello ............................ 99/295 |
| 6,935,222 | B2 | 8/2005 | Chen et al. |
| 6,994,015 | B2 | 2/2006 | Bruinsma |
| 7,059,239 | B2 | 6/2006 | Balkau |
| 7,827,905 | B2 | 11/2010 | Bardazzi |
| 2002/0088348 | A1* | 7/2002 | Cortese ............................ 99/295 |
| 2005/0098043 | A1 | 5/2005 | Bruinsma |
| 2005/0160919 | A1* | 7/2005 | Balkau ............................ 99/279 |
| 2006/0137534 | A1* | 6/2006 | Chin Chen et al. ............. 99/279 |
| 2007/0017375 | A1* | 1/2007 | Chen et al. ..................... 99/279 |
| 2007/0137493 | A1* | 6/2007 | Van Der Meer et al. ........ 99/279 |
| 2007/0151458 | A1 | 7/2007 | Chen et al. |
| 2008/0095904 | A1* | 4/2008 | Sullivan et al. ............... 426/431 |
| 2008/0141865 | A1 | 6/2008 | Bardazzi |
| 2008/0250936 | A1* | 10/2008 | Cortese ............................ 99/295 |
| 2009/0223374 | A1* | 9/2009 | Morin et al. .................... 99/287 |
| 2009/0249961 | A1* | 10/2009 | Cheng .......................... 99/289 R |
| 2009/0308258 | A1* | 12/2009 | Boussemart et al. ........... 99/295 |
| 2009/0308259 | A1* | 12/2009 | Hiron .......................... 99/323.3 |
| 2010/0064897 | A1* | 3/2010 | Trio ............................ 99/289 R |
| 2013/0247470 | A1* | 9/2013 | Zhong et al. ..................... 49/383 |
| 2013/0333574 | A1* | 12/2013 | Zhang et al. ..................... 99/295 |
| 2014/0109772 | A1 | 4/2014 | Denisart et al. |

FOREIGN PATENT DOCUMENTS

| | | |
|---|---|---|
| DE | 60320121 T2 | 6/2009 |
| EP | 1495703 A1 | 1/2005 |
| EP | 1559351 A2 | 8/2005 |
| EP | 1967099 A1 | 9/2008 |
| WO | 2004028318 A1 | 4/2004 |
| WO | 2007031378 A2 | 3/2007 |

* cited by examiner

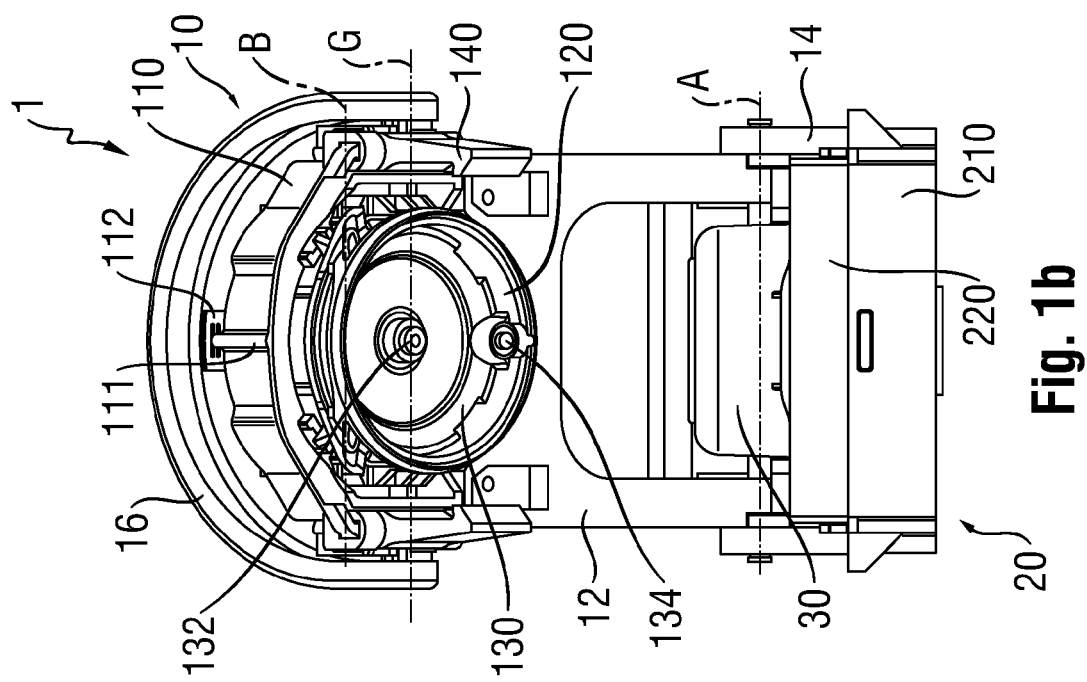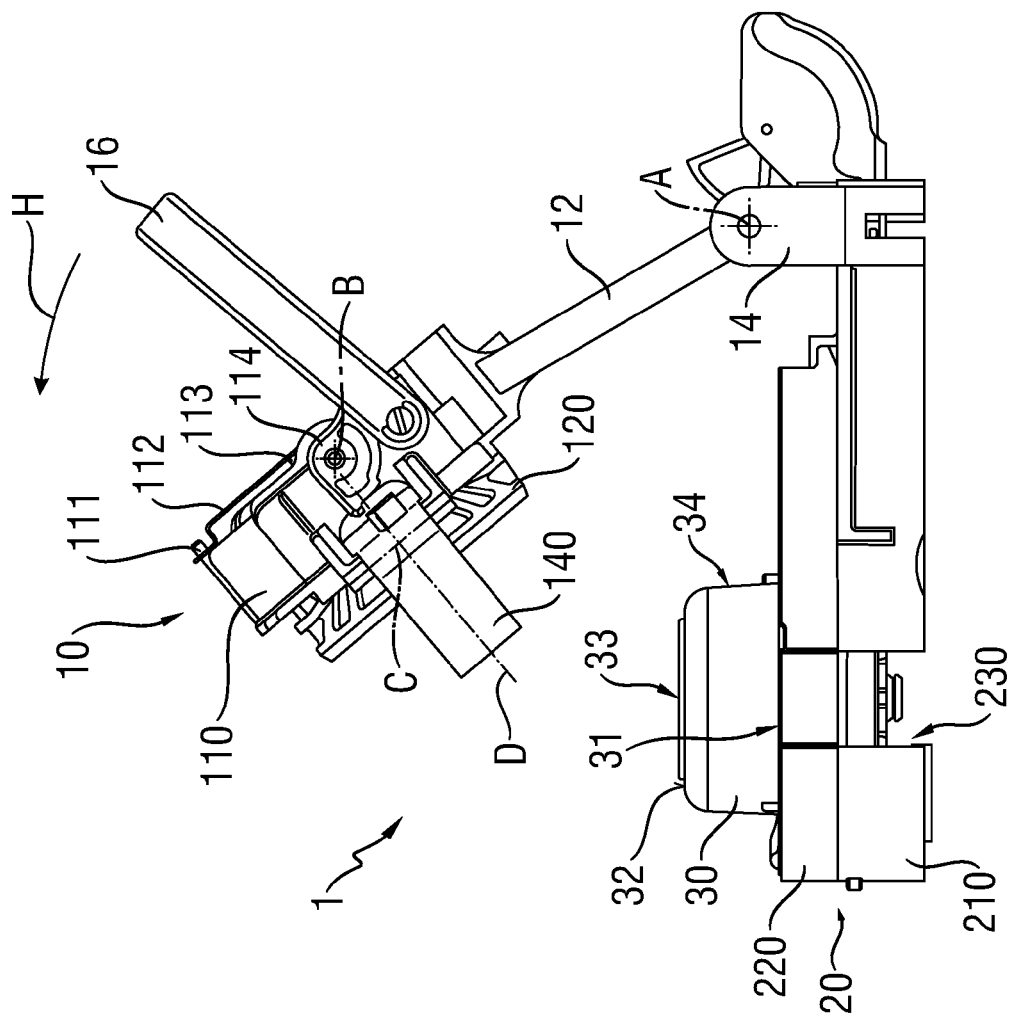

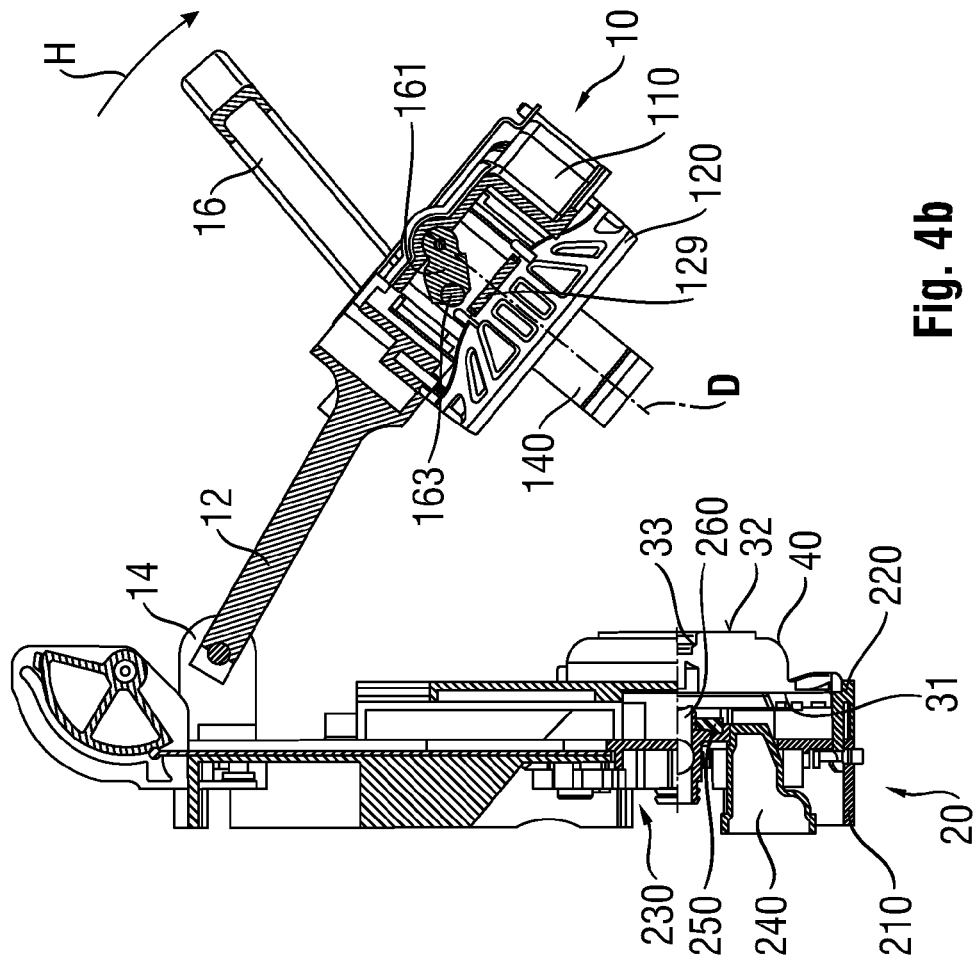
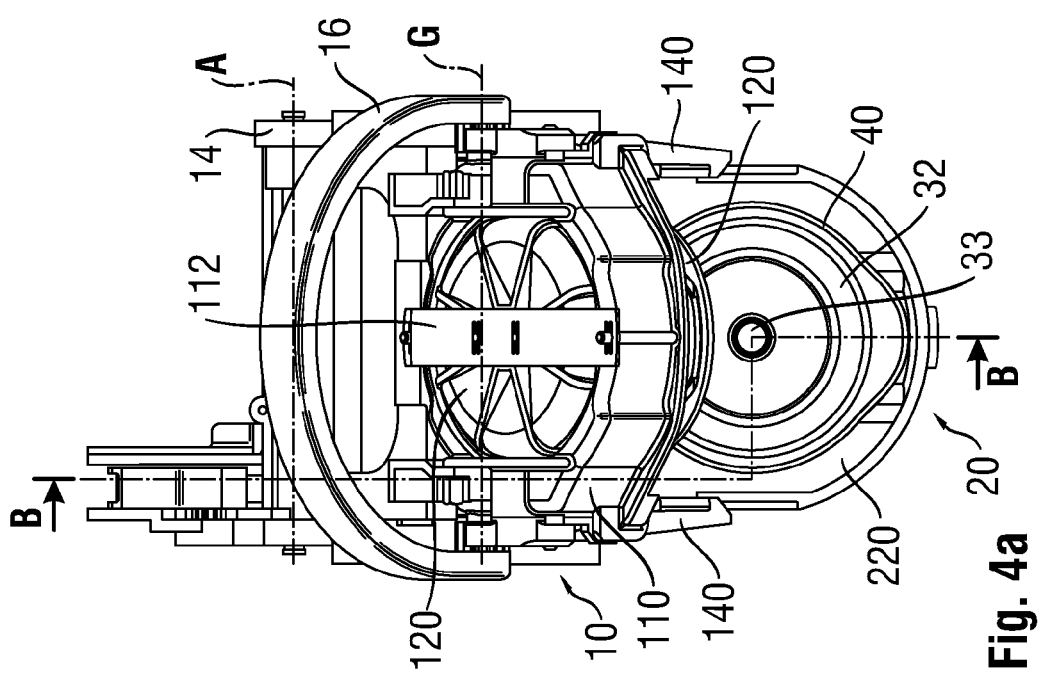
Fig. 4a
Fig. 4b

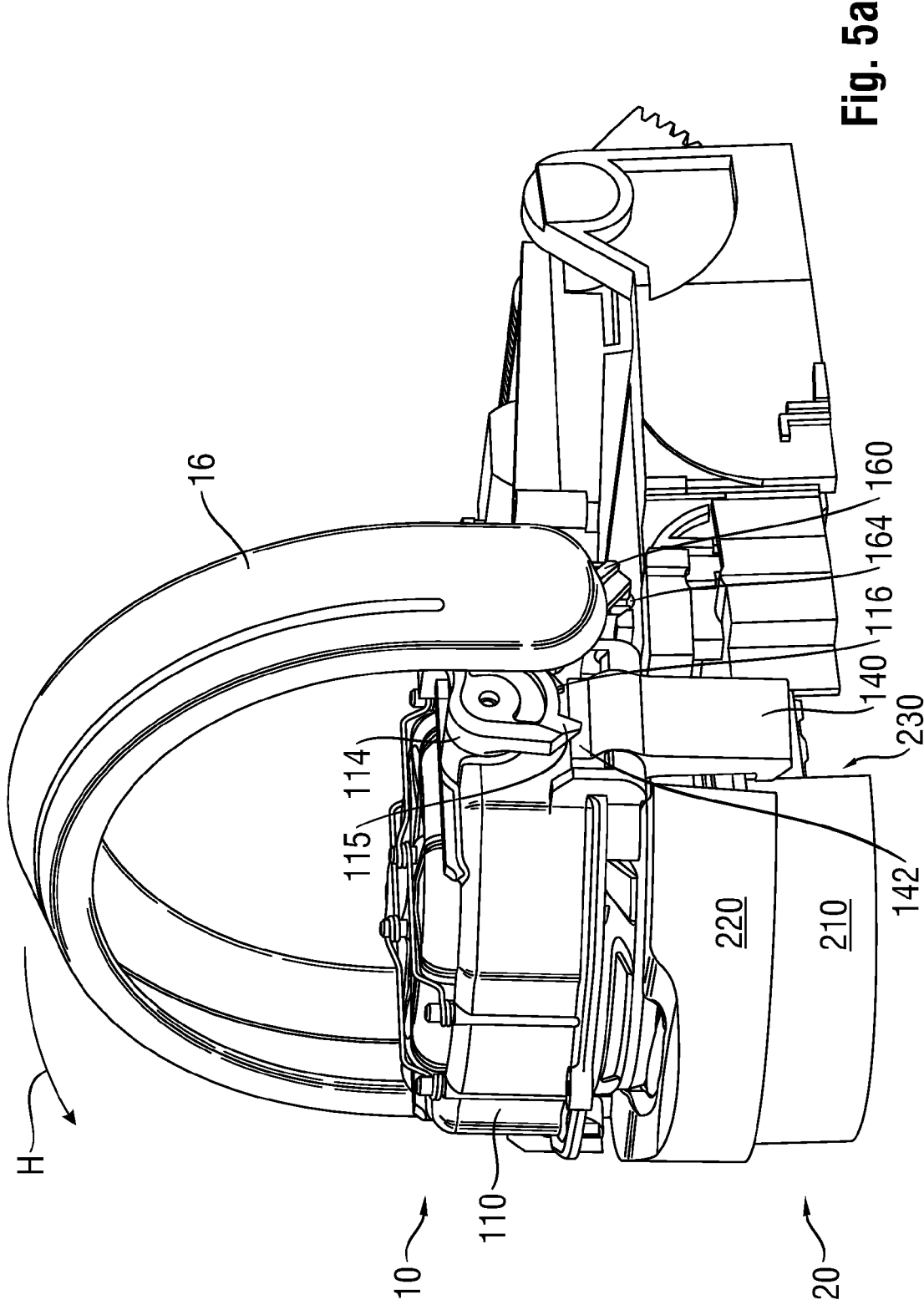

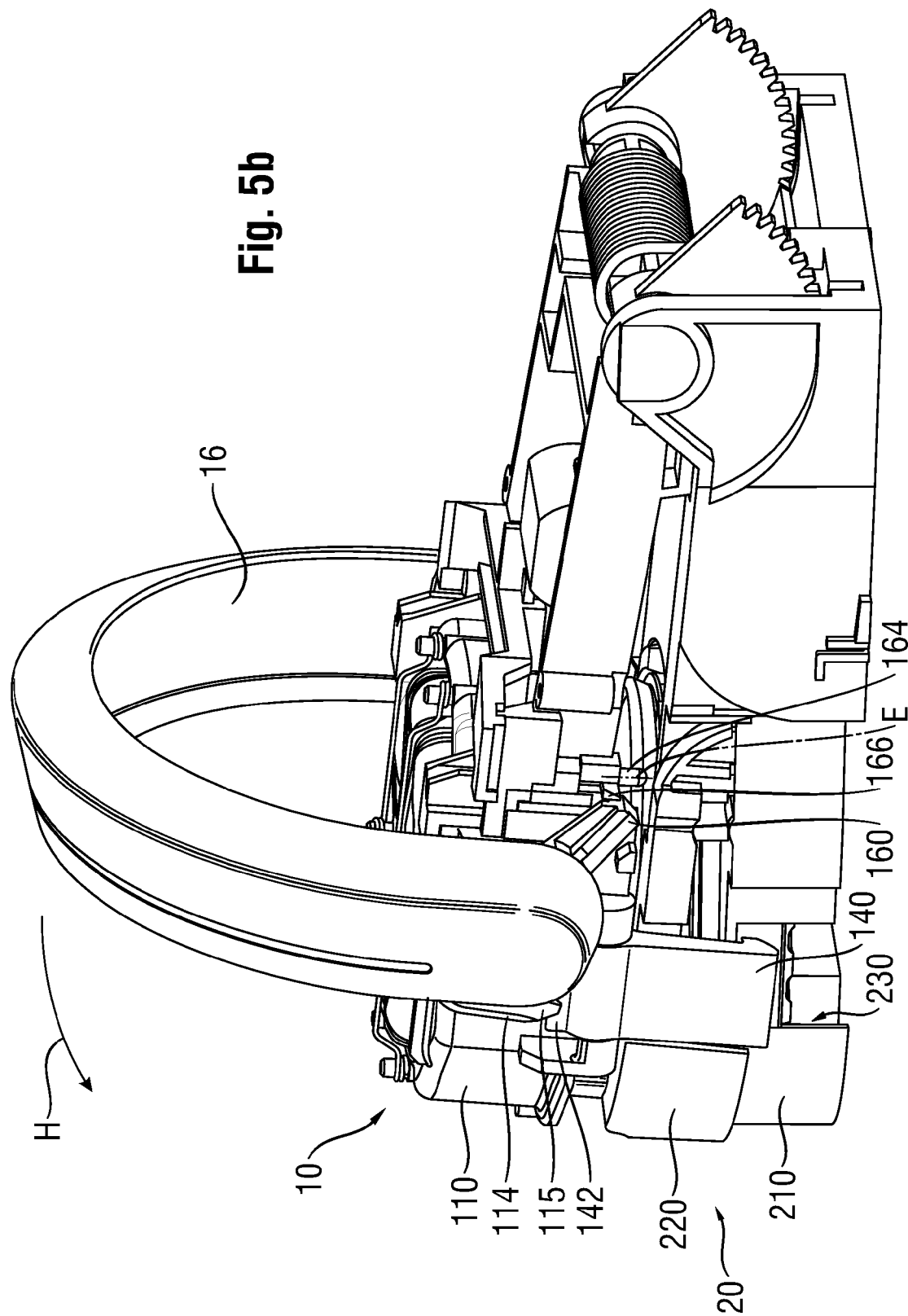

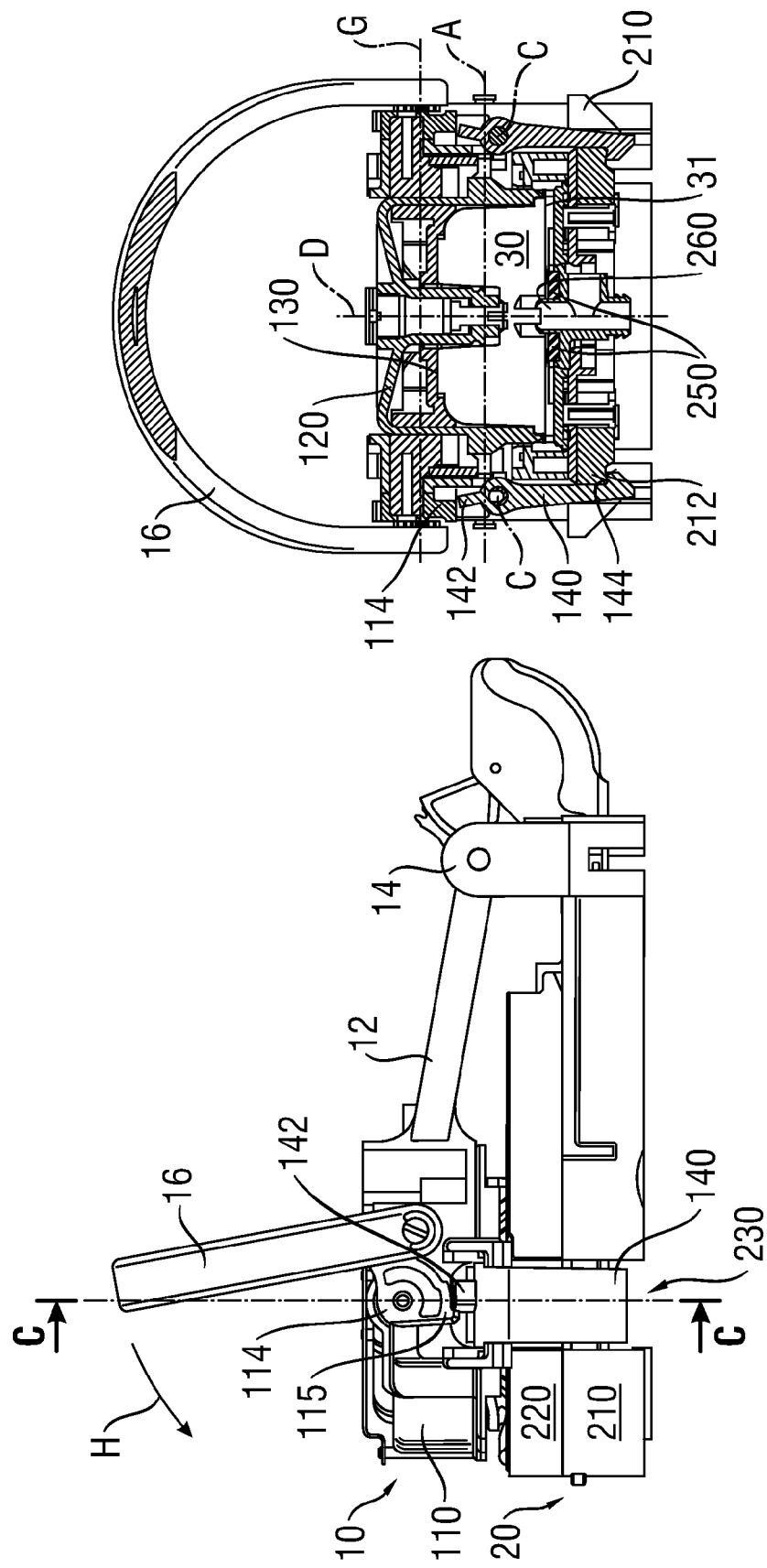

BREWING HEAD OF A HOT-BEVERAGE PREPARATION DEVICE, PREPARATION DEVICE HAVING A BREWING HEAD AND OPERATING METHOD FOR SAID PREPARATION DEVICE

BACKGROUND OF THE INVENTION

The invention relates to a brewing head of a hot beverage preparation facility for household use, for example a coffee maker, which can be fitted with pot-shaped substrate capsules. The brewing head comprises a brewing chamber to receive the substrate capsules. It consists of a fixed brewing chamber part and a movable brewing chamber part, with which the brewing chamber can be opened for example by a rotary pivoting movement or a translational displacement, to position the substrate capsules therein. The brewing chamber comprises a locking facility for locking the brewing chamber. It has a seal for sealing off one of the two brewing chamber parts with the substrate capsule in a pressure-tight manner during beverage preparation. The invention also relates to a hot beverage machine for household use having such a brewing head and an actuation method for closing a brewing chamber when the hot beverage machine is activated and an actuation method for opening the brewing chamber of the hot beverage machine.

DE 20 2008 014 160 U1 describes a compact brewing head for a beverage preparation machine. It comprises a pivotable cover, which can be pivoted down onto a fixed base after a substrate capsule has been inserted into a holder for the purposes of beverage preparation. It is operated using a handle for both closing and opening purposes, said handle allowing a user to discern an open and closed position by latching.

BRIEF SUMMARY OF THE INVENTION

The object of the invention is to embody the operation of the hot beverage preparation facility more safely, in order to prevent injury to the user, particularly in the event of incorrect operation.

The object of the invention is achieved with the brewing head mentioned above in that it allows three operating positions of the brewing chamber:

an opening position serves for the removal of a used substrate capsule and the loading of the brewing chamber with an unused substrate capsule. In the opening position the brewing chamber parts are moved apart and the pivotable brewing chamber part is pivoted up;

in a partially open or partially closed position the brewing chamber is closed and can therefore not be loaded but its seal is still detensioned;

in a closed or locked position the brewing chamber is likewise closed but the seal is tensioned. Beverage preparation can take place in this position as the substrate capsule is enclosed in the brewing chamber in a pressure-tight manner.

When the substrate capsule has been inserted into the brewing chamber and the brewing chamber has been closed, it abuts against one of the two brewing chamber parts and is pressed onto the other brewing chamber part. The seal is positioned in one of the two brewing chamber parts in such a manner that it seals the substrate capsule off from said brewing chamber part. However for the sake of simplicity in the following, reference is made to the sealing off, closing and detensioning of the "brewing chamber" even though this refers to the sealing off, etc. of the substrate capsule from one of the two brewing chamber parts.

The invention is therefore not intended to allow the opening and closing process to take place in one move and without transition between an opening position and a closed position. Rather it adheres to the principle of dividing the closing and opening process into a number of defined and mutually delimited sub-steps. This ensures a greater level of safety when closing the brewing chamber in a pressure-tight manner on the one hand and releasing the brewing chamber after a preparation process on the other hand, as division into sub-steps allows the reliable and safe movement into each sub-position to be monitored. In the event of errors, a signal can be output if required or movement to the next position can be blocked to indicate malfunction. On the one hand this ensures the reliable, tight closure of the brewing chamber prior to a preparation process and on the other hand it reliably prevents uncontrolled detensioning of the brewing chamber after a preparation process and injury to the user due to uncontrolled pressure release. This makes operation of the hot beverage preparation facility much safer.

According to the invention the closing of the brewing chamber and its opening are therefore divided into sub-steps. According to one advantageous embodiment of the invention the brewing head has a pre-locking facility as part of the locking system, locking the two brewing chamber parts together in the partially closed and partially open position. In this position the seal is not yet tensioned or is already detensioned. During the opening process therefore, as the change is made from the closed to the partially closed position, only the seal is initially detensioned in a deliberate and controlled manner, while the pre-locking system is still activated. Before the pre-locking system is released, allowing the brewing chamber to be opened completely, the operating pressure from the preceding preparation process can be released in a deliberate manner and can slowly escape from the brewing chamber. The pre-locking system therefore ensures that the operating pressure from the beverage preparation operation cannot force the brewing chamber open in an undesirable manner during opening, thereby injuring the user.

A pre-locking system can be implemented for example electrically by means of servomotors, electromechanically by means of magnetic switches or mechanically by means of corresponding closing mechanisms. Since in the case of an also otherwise mechanical operation of the hot beverage machine, mechanical pre-locking may be more reliable, according to a further advantageous embodiment of the invention the pre-locking facility comprises at least one hook, which is positioned on one of the brewing chamber parts and can be hooked onto the other brewing chamber part. One or more hooks can be operated simply as the pre-locking facility by way of lever structures and form a simply produced mechanical system, the reliable operation of which can be effectively monitored both mechanically and electronically for example by means of switches or sensors.

According to another advantageous embodiment of the invention the hook(s) of the pre-locking facility is/are pretensioned by a spring. The hooks therefore assume a defined position due to their spring pretensioning and not solely due to actuation on the part of the user, meaning that this happens more reliably. There is therefore no need for a separate actuation step for the hooks. The hook(s) is/are preferably pretensioned in its or their hooking direction. Hooking therefore takes place automatically, which does not mean that it is not necessary to check their success. Unlocking must therefore take place deliberately and counter to the force of the spring and cannot therefore really take place inadvertently. The spring-pretensioned pre-locking facility therefore also contributes to the operating safety of the hot beverage preparation facility.

It is however not impossible for manipulation of or damage to the preparation facility to prevent the pre-locking facility closing the brewing chamber reliably. Since secure pre-locking is a requirement for deliberate and controlled detensioning of the brewing chamber during opening, this would have an adverse effect on the operating safety of the preparation facility. According to a further more advantageous embodiment of the invention the brewing head therefore has a stop that blocks the movement of the brewing chamber into the closed position, if the pre-locking facility is unlocked or not correctly and completely locked. To this end the brewing head can automatically detect the position of the pre-locking facility and prevent the initiation of a beverage preparation process if the pre-locking facility is not reliably activated. Such a stop can be configured electronically, in that sensors or contacts for example monitor the reliable locking of the pre-locking facility. The stop can also be embodied mechanically in that the pre-locking facility itself blocks the further operation of the beverage preparation facility mechanically, if it is not in the locked position. Further actuation, of an operating lever of the preparation facility for example, can be blocked, if the hook(s) of the pre-locking facility is/are not latched in place. This ensures the reliable activation of the pre-locking facility to protect the user.

Since the seal is still or already detensioned in the partially closed position and is tensioned in the closed position, it is activated or deactivated separately between the partially closed and the closed positions. It can be tensioned by a slight lift, which can be part of the closing movement of the brewing chamber. According to one advantageous embodiment of the invention the brewing head comprises a brewing pot chamber at least in one of the two brewing chamber parts, said brewing pot chamber being able to be moved between an opening position with a detensioned seal and a closed position with a tensioned seal. It is thus possible to seal off the brewing chamber or to seal off one of the two brewing chamber parts from the substrate capsule independently of the movement of the brewing chamber parts. This also means that the detensioning of the seal and therefore the release of the pressure in the brewing chamber after a beverage preparation process can be controlled separately. The brewing chamber pot therefore ensures the sealing required for operation and allows operationally safe detensioning of the brewing chamber. The locking facility locks it in the closed position when the seal is tensioned.

There are substrate capsules of different volume, which are differentiated by their height in relation to their axis of symmetry. It is intended to be possible to fit the hot beverage preparation apparatuses with capsules of different heights. According to a further advantageous embodiment of the invention a brewing chamber carriage can be disposed in one of the brewing chamber parts and can be fixed in at least two closed or stop positions within the brewing chamber part. The closed and stop positions result from displacing the brewing chamber carriage along a height axis of the brewing chamber. The brewing chamber carriage can be pretensioned with a spring at least in a lower position, which is assigned to the processing of a small capsule. The spring stiffness can be such that the brewing chamber carriage can be displaced by a larger or large capsule counter to the force of the spring. In an upper position, which corresponds to the processing of a large capsule, the brewing chamber carriage can rest against a housing wall of the brewing chamber so that there is no need for a stop in this position. The brewing chamber carriage can be stopped in the one position or optionally in all positions by means of an actuation lever. If there are only two different brewing chamber carriage positions for a small and large substrate capsule, there is no need for a separate operating step in which the user would have to set the brewing head for the capsule used.

Operation of the preparation facility is to be embodied as simply as possible and so that it is largely comprehensible to the user. To this end some type of actuation element is positioned on the brewing head to open and close the brewing chamber. Sufficient for this purpose is a suitable surface or a fixed handle, which is positioned on the movable brewing chamber part, with which it can be moved toward the fixed brewing chamber part. A lever can be attached to activate the locking facility. According to a further advantageous embodiment the brewing head comprises an actuation lever, which can also be used to actuate the pre-locking facility as well as to open, close and lock the brewing chamber. To this end it is positioned in a movable manner on the brewing chamber part, so that it can be displaced between at least two positions. In a first position it can serve to operate the movable brewing chamber part; with the assumption of the second position it is possible to actuate the pre-locking facility. It facilitates the operation of the preparation facility because only the same lever has to be operated to open and close as well as to switch between the partially closed and the closed or open positions. Simple operation also represents a safety aspect, because the user is not confused by a plurality of actuation facilities and does not have to think about operating them in the correct sequence. A single actuation lever therefore enhances user-friendliness and also the operating safety of the preparation facility.

According to a further advantageous embodiment of the invention the brewing chamber carriage can also be stopped by the actuation lever. This means that there is no need for a separate actuation lever to stop the brewing chamber carriage. Even though it can be used for substrate capsules of different sizes, it does not complicate the operation of the preparation facility, because no additional operating facility is required despite the additional function. Stopping represents an additional safety aspect. The additional or integrated operation of the brewing chamber carriage by the actuation lever means that the user does not notice when it is stopped, which might cause an alert user to be surprised but does not complicate the operation of the preparation facility. To this end a displaceable stop carriage can lock the brewing chamber carriage to the brewing chamber, in that it can be displaced itself in a direction perpendicular to the displacement direction of the brewing chamber carriage and engages in the brewing chamber carriage in its stop position(s). It can be displaced electrically in response to a sensor signal or can be driven from the operating lever by way of a lever mechanism.

So that the preparation facility can be moved by a single actuation lever from its opening into the closed position and vice versa, the individual operating processes required to do this, for example the pre-locking or activation of the seal, must take place in the correct sequence and be monitored. This can essentially be done electronically in that for example the pre-locking facility or the brewing chamber pot is moved by electric motor into the required position as a function of the position of the actuation lever and its correct position can be verified by sensors or switches. According to a further advantageous embodiment of the invention however the actuation lever, the pre-locking facility and the brewing chamber pot are coupled mechanically in such a manner that the brewing chamber pot can only be moved and/or stopped after actuation of the pre-locking facility, since a mechanical coupling, which ensures the correct sequence of operating processes, in other words the activation of the pre-locking system before the locking of the brewing chamber pot during closing and similarly conversely during opening, requires less space than separate, for example electrically operated servomotors and associated switches or sensors. Also a mechanical coupling allows the sequence of operating processes and their reliable execution to be established not only in the closing direction but also in the counter direction without any major additional structural outlay.

According to a further advantageous embodiment of the invention the brewing head comprises a blocking element, which blocks the movement of the actuation lever until the movable brewing chamber part rests on the fixed brewing chamber part. The blocking facility ensures a necessary sequence of operating processes, according to which the movable brewing chamber part is first swung onto the fixed brewing chamber part, before the brewing chamber pot can be moved and stopped. Otherwise for example the pre-locking facility could inadvertently be already activated, even though the brewing chamber is not yet closed. The blocking element however ensures that the movable brewing chamber part rests on the fixed brewing chamber part before the pre-locking system is activated and the brewing chamber carriage is stopped. In one simple mechanical embodiment the blocking element can comprise a push button, which is actuated when the movable brewing chamber part comes into contact with the fixed brewing chamber part. It can be connected mechanically to a safety catch which only releases a lifting or pivot path of the actuation lever when the push button is actuated.

The object cited in the introduction is also achieved by a hot beverage preparation machine, which has a brewing head as claimed in one of the preceding claims.

The object cited in the introduction is also achieved by means of the above-mentioned actuation method for closing a brewing chamber when activating a hot beverage machine having a manually operatable brewing chamber for processing substrate capsules, the hot beverage machine comprising a closable brewing chamber with a locking system and a pre-locking system for this purpose. The actuation method comprises the following steps:
a) inserting a fresh substrate capsule,
b) closing the brewing chamber,
c) activating the pre-locking system of the brewing chamber,
d) activating the locking system of the brewing chamber.

By dividing up the closing process for the brewing chamber, it is possible to achieve a much higher level of operating safety, because the procedures can operate separately from one another and in the predefined mandatory sequence. Also a verification step can be inserted or performed after every operating step, to verify the success of the previous step. It can thus be verified, in particular after activating the pre-locking system, whether this has been done correctly and successfully. If activation or some other operating step has not been successful or has not been completed, the further method can be stopped, the next operating step blocked and/or a corresponding signal output. The method therefore ensures that the preparation machine can reliably be operated only in the intended manner and therefore with maximum operating safety.

The object cited in the introduction is also achieved by an actuation method for opening the brewing chamber of the hot beverage machine having a manually operatable brewing chamber for processing substrate capsules, which comprises a locking system and a pre-locking system for the brewing chamber. The method comprises the following steps:

a) releasing the locking system to release preparation pressure from the closed brewing chamber,
b) releasing the pre-locking system to release the closed brewing chamber and
c) opening the brewing chamber to remove the used substrate capsule and if required to insert a fresh substrate capsule.

The division of the opening process and the interposition of at least one separate method step enhance the operating safety of the preparation facility and the safety of the user. The method in particular ensures that the preparation pressure is first released from the brewing chamber, which is to be opened after a beverage preparation process. According to the invention it is however still pre-locked or partially closed during the release of pressure and cannot therefore be forced open by the preparation pressure in particular. Only then can it be opened completely, without the preparation pressure being able to injure the user.

According to one advantageous embodiment of the method, when the brewing chamber is opened, the substrate capsule can be ejected mechanically by the appliance. This is preferably done by ejecting it into a residue container, so that the brewing chamber is immediately ready for the insertion of a fresh substrate capsule, without any operating step on the part of the user being required. This makes the preparation machine more user-friendly.

BRIEF DESCRIPTION OF THE DRAWINGS

The principle of the invention is described in more detail below by way of example with reference to a drawing, in which:

FIG. 1 shows a side and front view of an open brewing head of a first embodiment, FIG. 4 shows a plan view of the brewing head and a further sectional view of the brewing chamber upper part of the first embodiment along the section line B-B, FIG. 5 shows two perspective oblique views of the brewing head of the second embodiment, FIG. 7 shows a side view and a sectional view along the section line C-C according to the first embodiment.

DETAILED DESCRIPTION OF EXEMPLARY EMBODIMENTS OF THE PRESENT INVENTION

Figure 2A:
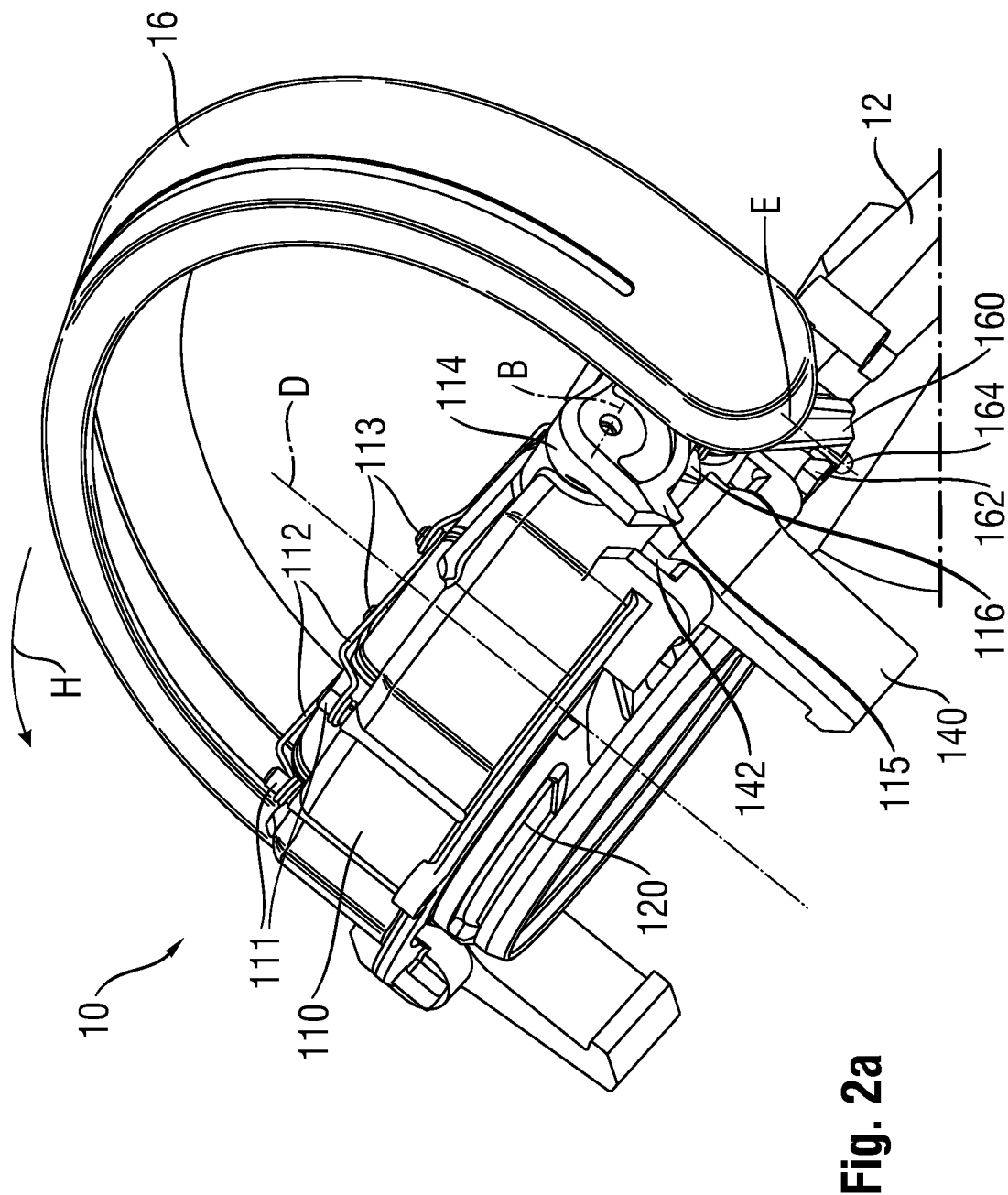
FIG. 2 shows two perspective oblique views of a brewing chamber upper part of a second embodiment.

FIG. 1a shows a side view of an open brewing head 1 and FIG. 1b shows a front view. It comprises a brewing chamber upper part 10 and a brewing chamber lower part 20. The brewing chamber upper part 10 is connected to the brewing chamber lower part 20 in such a manner that it can be pivoted about a pivot axis A by way of a brewing head arm 12 at a support block 14. The brewing head 1 and with it the pivotable brewing chamber upper part 10 can be actuated with the aid of an operating lever 16, for example when the brewing chamber upper part 10 is pivoted down onto the brewing chamber lower part 10. The brewing chamber parts 10, 20 are locked together to form a brewing chamber and to enclose a substrate capsule, in this instance a large substrate capsule 30.

The brewing chamber lower part 20 consists of a frame 210, in which two hook recesses 230 are configured on both sides and opposite one another. Located on the frame 210 is an ejector 220, on which the large brewing capsule 30 is positioned with a laminate 31 sealing it on its lower face.

The brewing chamber upper part 10 comprises an annular housing 110, on which the operating lever 16 is positioned in such a manner that it can be pivoted in a closing direction H and about an axis G. FIG. 1*a* shows it in a basic position, in which it is angled slightly toward the front face of the brewing head 1 and therefore at an angle of around 80° to the upper face of the housing 110 for a user. It engages by way of teeth (not shown) in a control plate 114, which is likewise positioned on the housing 110 and in such a manner that it can be pivoted in the counter direction of the operating lever 16 about the axis B. The housing 110 encloses a cylindrical brewing pot 120, which can be displaced slightly within the housing 110 along a displacement axis D. The amplitude of the displacement of the brewing pot 120 along the axis D in relation to the housing 110 is restricted to a slight lift of a few millimeters. A spring clip 112 is fastened on the upper face of the housing 110 to pins 111 and on the brewing pot 120 to pins 113, which are molded on the housing 110 or brewing pot 120. The brewing pot 120 is thus supported in a floating manner, which serves inter alia to compensate for tolerances between the brewing pot 120 and the housing 110.

An essentially disk-shaped brewing chamber carriage 130 is supported (see FIG. 1*b*) within the brewing pot 120 in such a manner that it can also be displaced along the axis D (see FIG. 1*a*). It has a central centering pin 132 and an off-center positioning pin 134, both of which engage in an upper face 32 of the large substrate capsule 30. The central centering pin 132 engages in a central blind hole in the capsule 30 (see FIG. 3*a*), ensuring that the substrate capsule 30 is positioned centrally within the brewing head 1 or brewing pot 120. The smaller off-center positioned pin 134 engages in a corresponding indentation 34, likewise not shown in FIG. 1*a*, on the edge of the substrate capsule 30. If the capsule 30 is not inserted correctly, the brewing head 1 cannot therefore be closed.

Hooks 140 are positioned on the brewing chamber upper part 10 on both sides and opposite one another. They are positioned in such a manner that they can be pivoted about an axis C that runs horizontally when the brewing head 1 is in the closed state. When the brewing head 1 is in the closed state, they engage in the hook recesses 230, thereby representing an essential component of the pre-locking facility of the brewing head 1. In their closed position, in other words swung inward, they are spring-pretensioned and can be pivoted apart in the manner described in detail below by the operating lever 16 and the control plate 114 to open the brewing head 1.

Figure 2B:
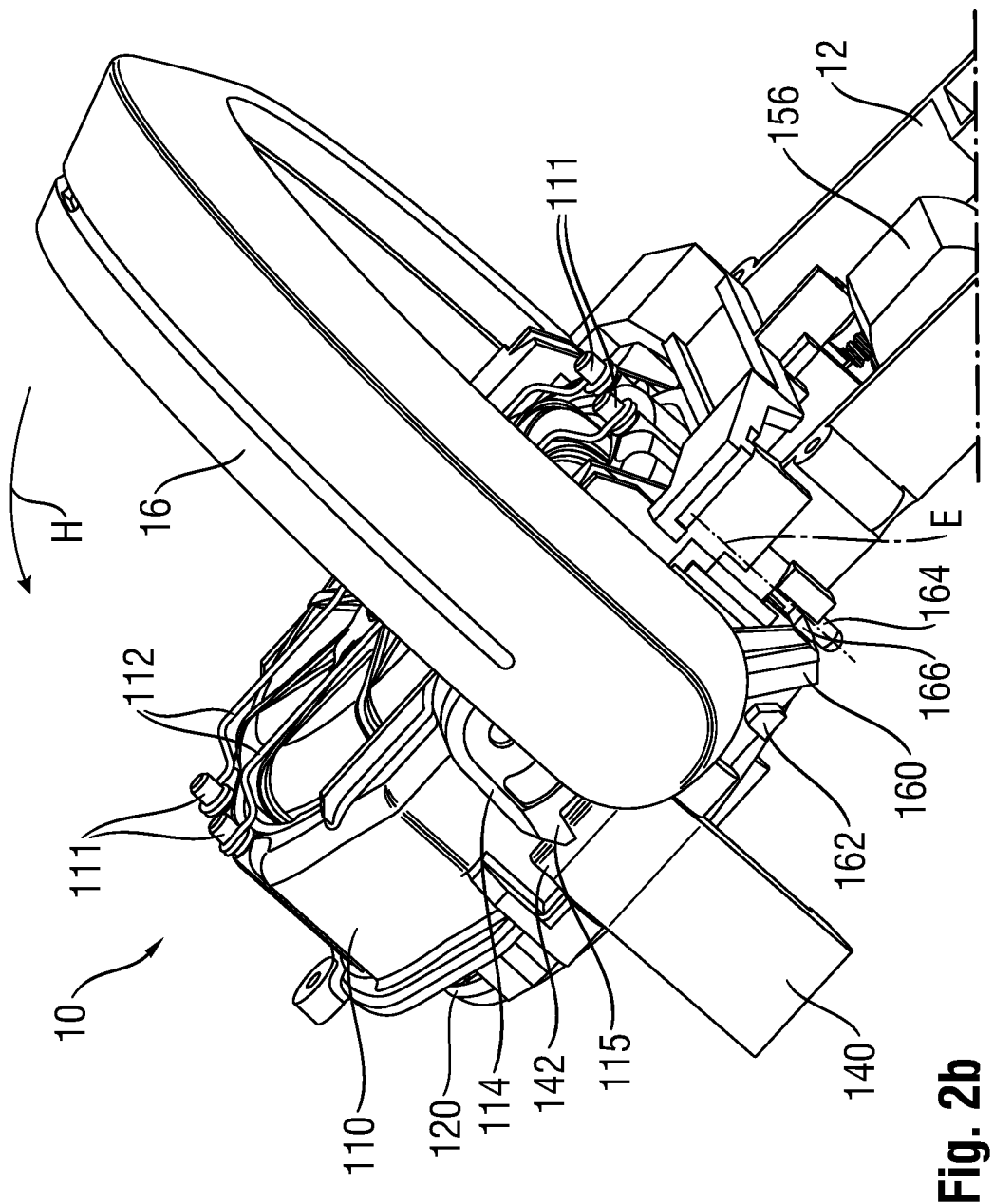

This is shown in greater detail in perspective views of the brewing chamber upper part 10 in FIGS. 2*a* and 2*b*. The brewing chamber upper part 10 has a slightly modified design for example in respect of the operating lever 16. Its structure and function however remain the same. In contrast to FIG. 1, the housing 110 according to FIGS. 2*a*, 2*b* has two spring clips 112, which are configured as bent wires, which are wound around pins 111 for fastening to the housing 110 and around pins 113 for fastening to the brewing pot 120.

In FIGS. 2*a* and 2*b* the operating lever 16 projects in a perpendicular manner from the upper face of the housing 110. It can only be moved into this position or to an angle of maximum around 100° to the upper face of the housing 110 counter to the closing direction H against the force of a spring (not shown), which pushes it into the basic position according to FIG. 1*a*. The operating lever 16 engages by way of teeth (not shown) in the control plate 114. When the operating lever 16 pivots forward in the closing direction H, in other words in the view in FIG. 2*a* counterclockwise, it rotates the control plate 114 clockwise about the pivot axis B.

A first lug 115 and a second lug 116 project radially from the control plate 114. In the opening position of the brewing head 1 illustrated in FIG. 2*a*, in other words when the operating lever 16 is in a position between around 80° and 100°, the lug 115 rests against an outer face of a shoulder 142. The shoulder 142 extends the hook 140 radially upward beyond its pivot axis C (see FIG. 1*a*). The first lug 115 therefore pushes the hook 140 on its shoulder 142 outward against its spring pretensioning. The second lug 116 is positioned on the control plate 114 opposite the first lug 115 with an axial offset in respect of the axis B such that in a closed position illustrated further below it rests against the opposing rear face of the shoulder 142, being located between it and the housing 110.

As already set out above, the pivotable brewing chamber upper part 10 can be pivoted down at the operating lever 16 and be lowered into an almost horizontal position on the brewing chamber lower part 20. However it should only be possible to pivot the operating lever 16 about the axis G (see FIG. 1*b*) in relation to the housing 110 when the brewing chamber upper part 10 has reached this position. To this end it has a spigot 160, which is connected in a fixed manner to it and projects radially from the axis G (see also FIG. 2*b*). A stop 162 on the housing 110 prevents the operating lever 16 being able to pivot too far back counter to the closing direction H or any further than around 100° in relation to the brewing chamber upper part 10. A spring pin 164 is supported in such a manner that it can be displaced along an axis E with spring loading in the housing 110 in proximity to its connection to the brewing head arm 12. It moves out when the brewing head 1 is opened. When the brewing head 1 is closed, in other words the brewing head upper part 10 is lowered onto the brewing head lower part 20, the spring pin 164 is inserted into the housing 110 counter to the spring force. A triangular bolt 166 projects radially from the spring pin 164 and into a pivot path of the spigot 160, which the spigot 160 travels as the operating lever 16 pivots down. If the spring pin 164 has moved out, because the brewing chamber upper part 10 and the brewing chamber lower part 20 are not resting against one another, the triangular bolt 166 blocks any movement of the spigot 160 and clamps it between itself and the stop 162. However as soon as the spring pin 164 enters the housing 110, because the brewing chamber upper part 10 and the brewing chamber lower part 20 are resting against one another, the triangular bolt 166 is moved out of the pivot path of the spigot 160 so that it no longer prevents the latter's movement. The operating lever 16 can therefore only be pivoted forward in the closing direction H when the brewing chamber upper part 10 and the brewing chamber lower part 20 are resting against one another.

Figure 3A:
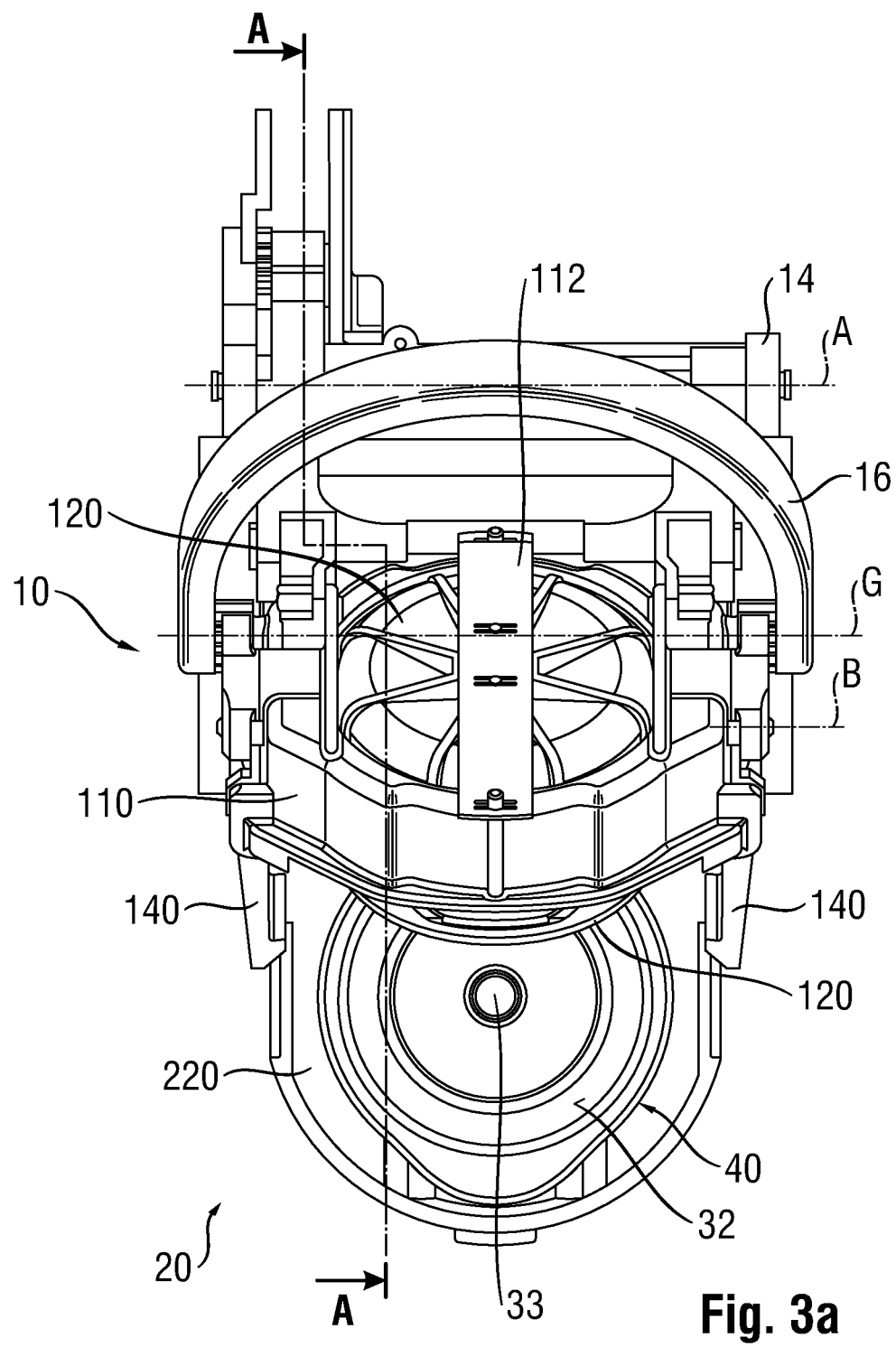
FIG. 3 shows a plan view of the brewing head of the first embodiment and an associated sectional view of the brewing chamber upper part along the section line A-A.
Figure 3B:
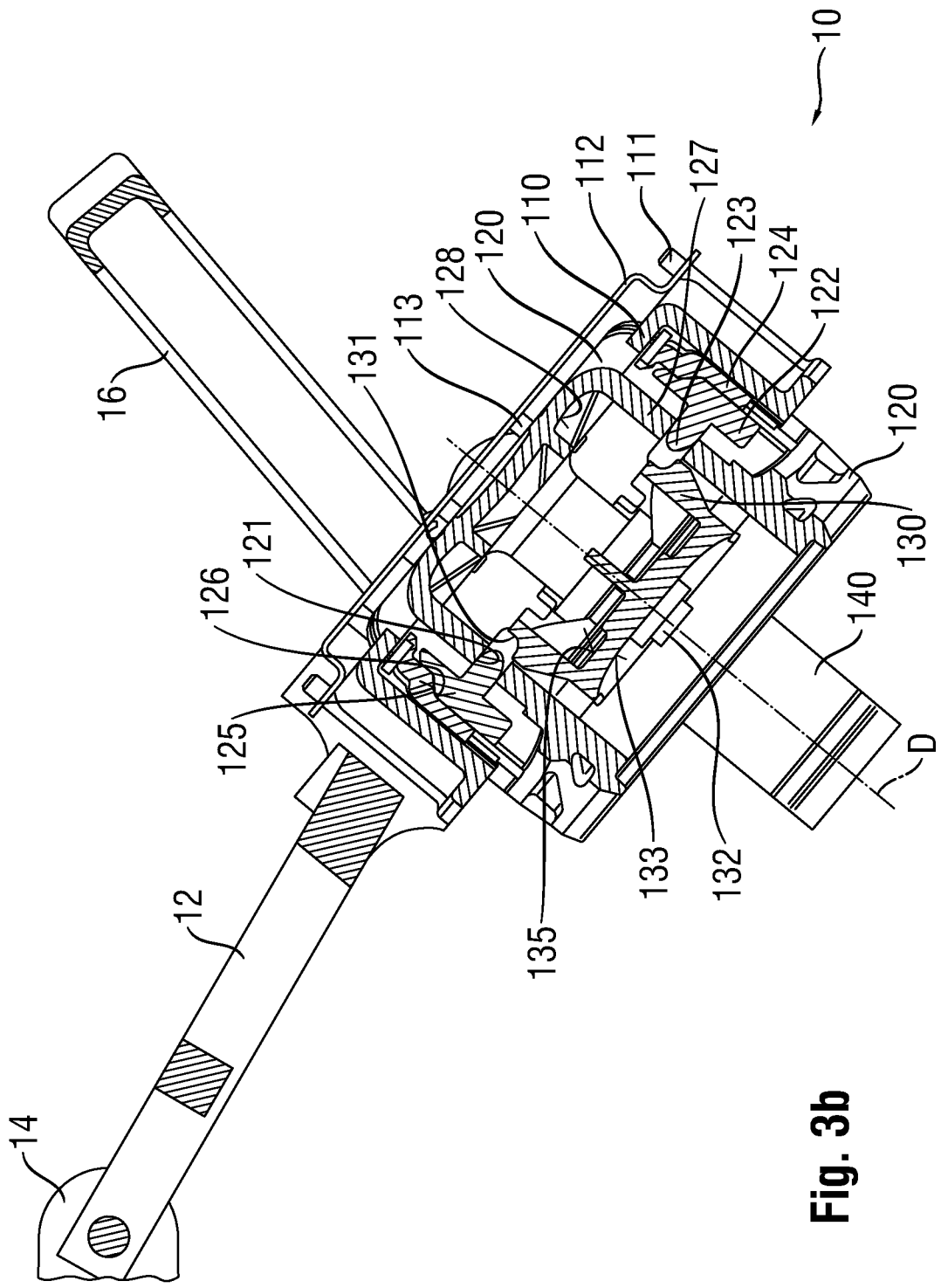

FIGS. 3*a*, *b* serve to clarify the internal structure of the brewing chamber upper part 10. FIG. 3*a* shows a plan view of an opened brewing head 1, the brewing chamber lower part 20 of which lies parallel to the plane of the page and the brewing chamber upper part 10 of which in contrast is pivoted about the axis A and projects obliquely toward the user. A small substrate capsule 40 is positioned on the ejector 220 of the brewing chamber lower part 20, it not being possible in this view to distinguish it from a large substrate capsule 30 (see FIG. 1). It also has a centrally disposed blind hole 33 on its upper face 32, in which the centering pin 132 (see FIG. 1b, 3b) engages when the brewing head 1 is closed. FIG. 3a shows a section line A-A, which is staggered in the upper half of FIG. 3a. However the staggering is largely insignificant, because the associated sectional diagram in FIG. 3b is essentially also restricted to the brewing chamber upper part 10, which remains unaffected by this.

The section line A-A does not run through the center of the brewing chamber upper part 10. The housing 110 enclosing the brewing pot 120 in an annular manner is shown. The pins 113, which are configured on the brewing pot 120 and project upward, suspend the brewing pot 120 in the spring clip 112, which is fastened to the housing 110 by way of the pins 111.

Supported within the brewing pot 120 is the brewing chamber carriage 130, which can be displaced along the axis D in relation to the brewing pot 120. In FIG. 3b it is in a lowered position, as required for processing the small substrate capsule 40 (see FIG. 3a). It rests with its end face 133, which supports both the centering pin 132 and the positioning pin 134, which is concealed in this view (see FIG. 1b), against the upper face 32 of the small substrate capsule 40, as soon as the brewing chamber upper part 10 is lowered onto the brewing chamber lower part 20. It abuts with its end face 133 against the upper face 32 of the small substrate 40, when it is pierced from its lower face by piercers (not shown) on the ejector 220.

To process a larger substrate capsule 30 the brewing chamber carriage 130 must be displaced upward into the brewing pot 120, in other words in the direction of the spring clip 12. It then abuts against an inner face 128 of the brewing pot 120, as shown separately in a later figure.

In its lowered position as shown in FIG. 3b, the brewing chamber carriage 130 is pretensioned by a spring (not shown), which extends between its upper face 135 and the inner face 128 of the brewing pot 120.

The brewing pot 120 has radial gaps 121 in its casing 127, through which convex stop lugs 123 project. When the brewing chamber carriage 130 is in the lowered position, they engage with its concave blocking surfaces 131. As a result the brewing chamber carriage 130 is blocked in relation to the brewing chamber pot 120 in a displacement direction toward the latter's inner surface 128. The stop lugs 123 are each part of a stop carriage 122, which can be displaced in a radial direction. This allows the lugs 123 to be moved in from their position shown in FIG. 3b to stop the brewing chamber carriage 130. In the stop position shown it holds a control ring 124, which runs around the brewing pot 120 and can be displaced along the displacement axis D within the housing 110. On its inner face the control ring 124 has a peripheral bevel 125, which corresponds to a leading surface 126 configured on the outer face of the stop carriage 122. The leading surface 126 allows the control ring 124 to be pushed onto the stop carriage 122 and the stop lugs to be pushed inward toward the brewing pot 120 against the spring force.

FIGS. 4a, b show a similar diagram to those in FIGS. 3a, b. FIG. 4a shows a plan view of an open brewing head 1 from an upper face that is largely similar to the one in FIG. 3a. In contrast to FIG. 3a it shows a different section line B-B staggered at a right angle.

FIG. 4b shows the associated sectional view. It shows a side section through the brewing chamber upper part 10, the housing 110 of which is cut through asymmetrically although its brewing pot 120 is not cut through. Positioned on it on the outside on both sides is a plate 129 that lies horizontally in relation to the perpendicular displacement direction D, on which plate 129 a roller 163 of an eccentric disk 161 can roll. The plate 129 and roller 163 are made of metal in order to be able to transmit high pressure forces with little roller friction.

The eccentric disk 161 lies within the housing 110 and is connected rigidly to the control plate 114 (FIG. 2a). When the operating lever 16 in FIG. 4b is pivoted downward in the closing direction H, the eccentric disk 161 and the control plate 114 (FIG. 2a) rotate in the counter direction, in other words counterclockwise. The eccentric disk 161 then presses the roller 163 onto the plate 129, which moves the brewing pot 120 supporting it downward. The brewing pot 120 is thus locked to the brewing chamber lower part 20.

FIGS. 1 to 4 show the brewing head 1 in its first operating position, namely in an opening position. In the following diagram the brewing head 1 is moved at the operating lever 16 from its opening position into a partially closed and finally a closed position. In this process a pre-locking facility and then a main locking facility are activated one after the other. Together they form the locking facility of the brewing head 1. Essential components of the pre-locking facility are the control plate 114 and the hooks 140, which engage in the hook recesses 230 (FIG. 1a). Components of the main locking system are the eccentric disk 161 with the roller 163, which act on the plate 129 at the brewing chamber pot 120.

The sectional view according to FIG. 4b also shows the brewing chamber lower part 20 with a small substrate capsule 40. The staggered section line B-B through the frame 210 and the ejector 220 reveals a barcode reader 240, which acts on the laminate 31 on the lower face of the substrate capsule 40. Offset upward next to this is an annular seal 250, which concentrically encloses a so-called piercer 260 as a pressure inlet (and a further piercer (not shown) as a pressure outlet). It represents a hollow pin with a chamfered tip and is disposed concentrically with the substrate capsule 40. When the brewing head 1 is closed, it pierces the laminate 31 of the substrate capsule 40 at a point opposite the blind hole 33. Since the brewing head 1 in FIG. 4b is not yet closed, the seal 250 is not yet in contact with the laminate 31 of the substrate capsule 40, in other words it is detensioned.

FIGS. 5a, 5b show perspective views of the brewing head 1 in a position shortly before it assumes the partially closed position. The brewing chamber upper part 10 is lowered onto the brewing chamber lower part 20. The spring pin 164 however does not yet touch the brewing chamber lower part 20 or the ejector 220, in other words it has not yet entered the housing 110 against the spring force. The triangular bolt 166 therefore continues to block a pivot movement of the spigot 160 at the operating lever 16. If the operating lever 16 does not pivot in the closing direction H, the control plate 114 can also not be rotated. Its lug 115 therefore remains without change on the shoulder 142 of the hook 140 and prevents it hooking into the hook recess 230 as a result of its spring pretensioning, which it is also not able to do with the brewing chamber upper part 10 in this position.

Figure 6:
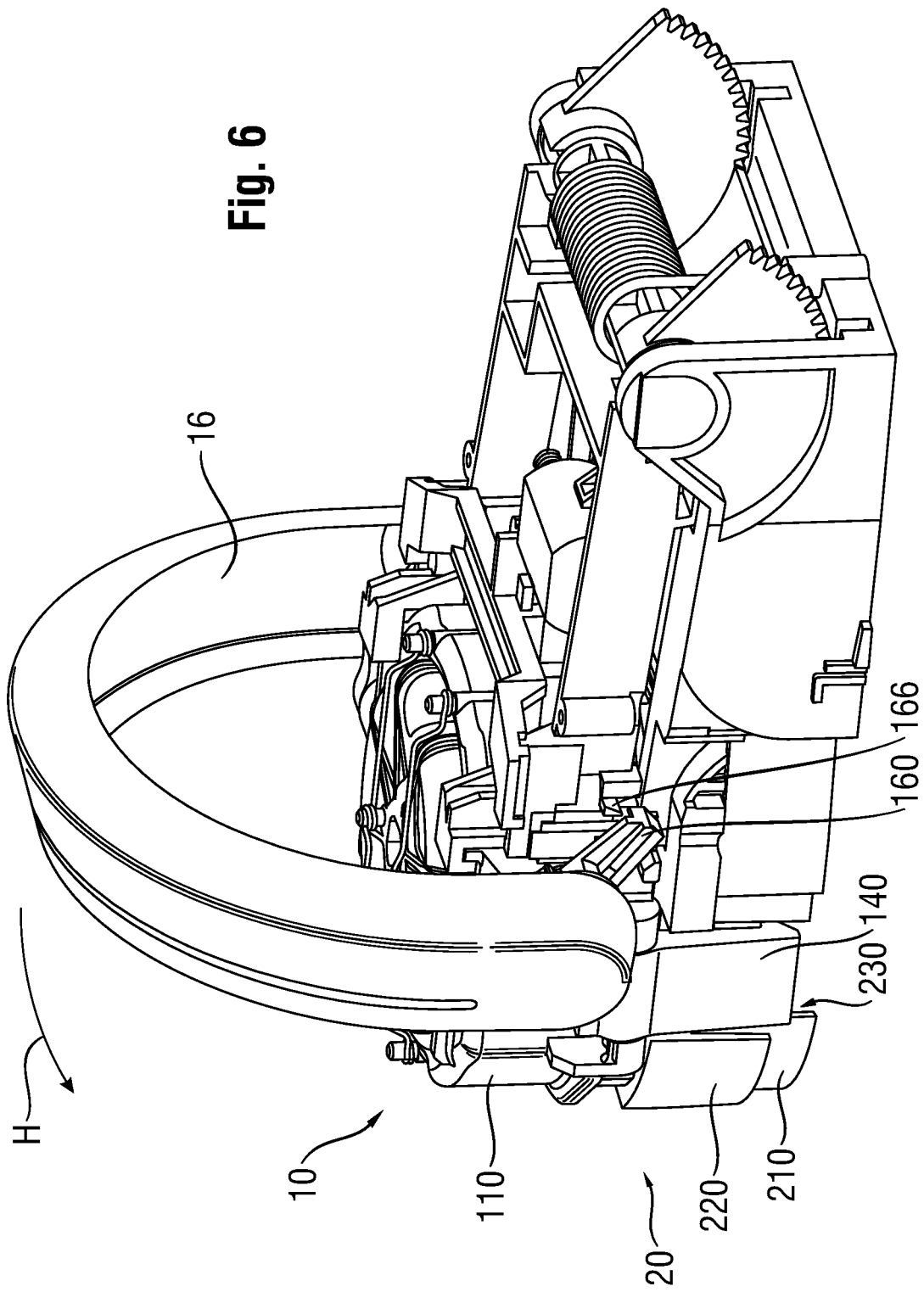
FIG. 6 shows a further perspective oblique view of the brewing head of the second embodiment.

FIG. 6 shows a similar perspective view to the one in FIG. 5b, in which the brewing chamber upper part 10 already rests on the brewing chamber lower part 20. This causes the spring pin 164 (see FIG. 5b) that can no longer be seen in FIG. 6a to be pushed into the housing 110, with the result that the triangular bolt 166 projecting from it is also pushed upward. It thus releases the pivot path of the spigot 160 at the operating lever 16 so that the operating lever 16 can now be pivoted downward in the pivot direction H.

This situation is shown in FIGS. 7a, b. FIG. 7b shows a sectional view along the section line C-C from FIG. 7a through the brewing head 1 with a large substrate capsule 30. The operating lever 16 is in the basic position (see FIG. 1a). The shoulder 142, which in this embodiment for dimensioning reasons only takes up part of the width of the hook 140, is free of the lug 115. The hook 140 can therefore move inward and therefore into the hook recess 230 as a result of its spring pretensioning. It hooks onto the frame 210, where it rests with its hook surfaces 144 flush with the frame surfaces 212 (FIG. 7b). The contact plane, in which the hook surfaces 144 and the frame surfaces 212 are located, is angled so that a vertical line onto the contact plane or the hook surfaces 144 and the frame surfaces 212 runs outside the pivot axis C of the hooks 140. The locking system is therefore configured to be self-retaining, because a pressure force acting in a perpendicular manner on the surfaces 144, 212 during operation generates a moment, which acts on the hook 140 in its closing direction not in its opening direction. The pressure force therefore acts as assistance for the locking system and not counter to it.

When the hooks 140 engage in the hook recesses 230, the pre-locking system of the brewing head 1 is activated. Movement of the operating lever 16 in the closing direction H and therefore counterclockwise turns the control plate 144 clockwise. It ensures mechanical blocking to prevent unwanted unlocking of the hooks 140, as the second lugs 116 now engage with each control plate 114 behind the shoulder 142 of the hook 140, in other words between the shoulder 142 and the housing 110 (see FIG. 2a), soon after the first lug 115 loses contact with the shoulder 142. The second lug 116 therefore blocks the pivoting of the hook 140 in its opening direction. However if the hooks 140 have not engaged completely in the hook recesses 230, for example have not pivoted far enough into the hook recesses 230, the operating lever 16 is blocked, because the second lugs 116 come up against the shoulder 142. Since the hooks 140, as essential parts of the pre-locking facility, are then not in their correct pre-locking position, no further operation of the appliance can take place. Instead the blocking of the operating lever 16 indicates to the user that there is a fault.

In the pre-locking position shown in FIGS. 7a, b the brewing chamber upper part 10 and the brewing chamber lower part 20 are locked together and the brewing head 1 is therefore partially closed. However the brewing chamber, in which the substrate capsule 30 is present, is not yet completely closed and the seal 250 is still detensioned. As the lever 16 continues to move in its closing direction H, the eccentric disk 161 turns (FIG. 4b) further counterclockwise and presses the roller 163 onto the plate 129. This pushes the brewing pot 120 downward along the displacement direction D within the housing 110. It takes the brewing chamber carriage 130 with it and presses the large substrate capsule 30 with its laminate 21 onto the ejector 220 or frame 210. In this process the piercer 260 pierces the laminate 31 of the substrate capsule 30. In order to prevent an unwanted egress of liquid at the piercer 260 when hot water is later directed into the capsule 30, when the brewing head 1 is closed the seal 250 closes off any possible gap between the substrate capsule 30 and the piercer 260 or the frame 210 (similarly also at the second piercer (not shown)). In this process it is compressed from its lower face or in turn pushes with its laminate 31 facing out into the substrate capsule 30. This activates the seal 250 and seals the substrate capsule 30 off from the ejector 220, so that together they form a fully sealed and leakproof brewing chamber.

Figure 8B:
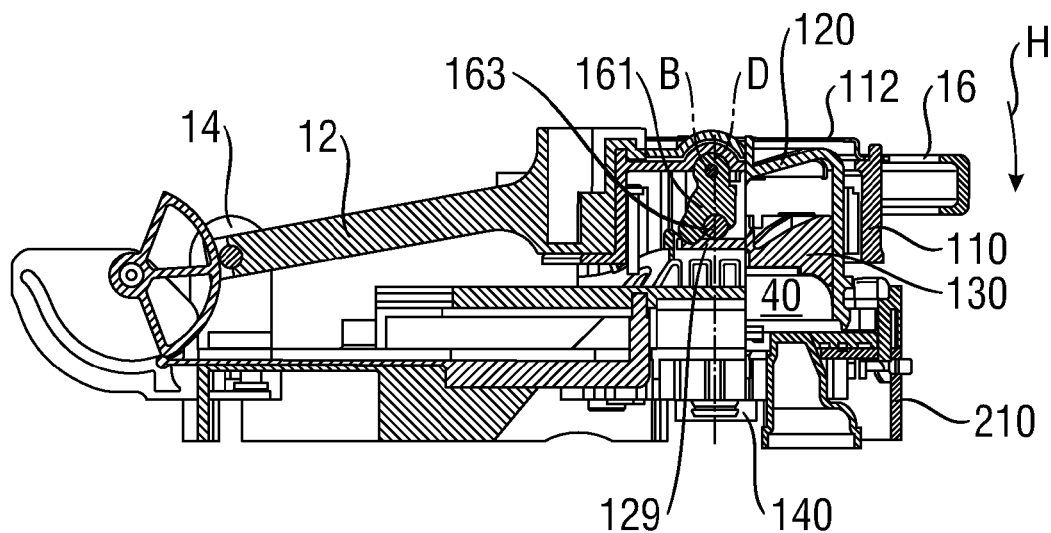
FIG. 8 shows a side view and a sectional view along the section line D-D according to the first embodiment.
Figure 8A:
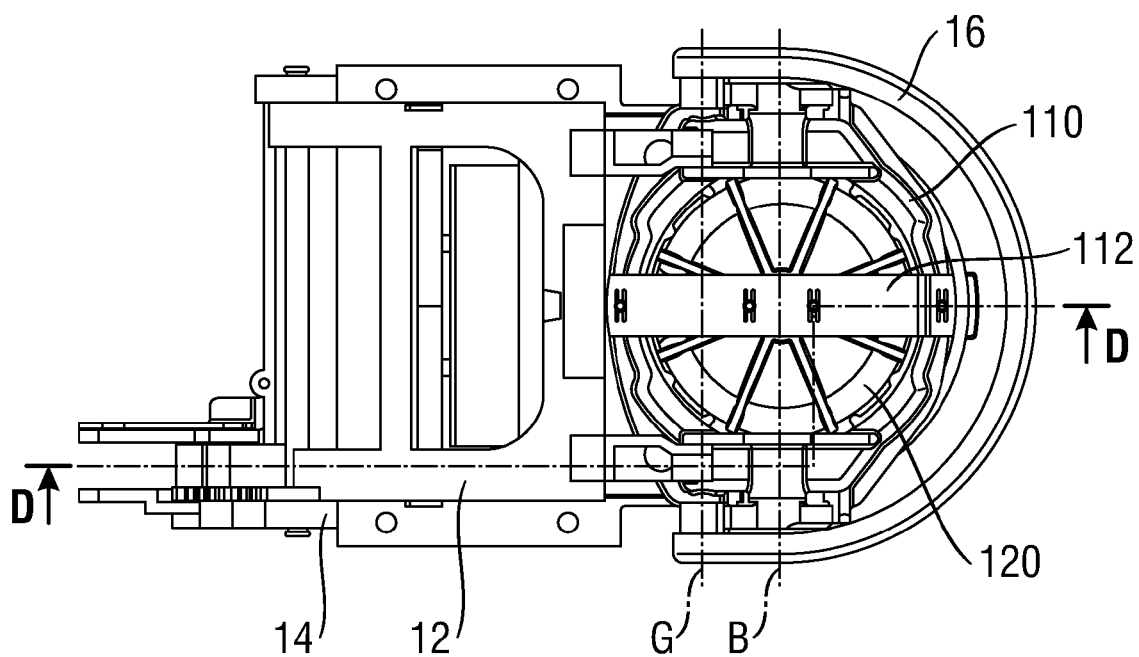
Figure 9:
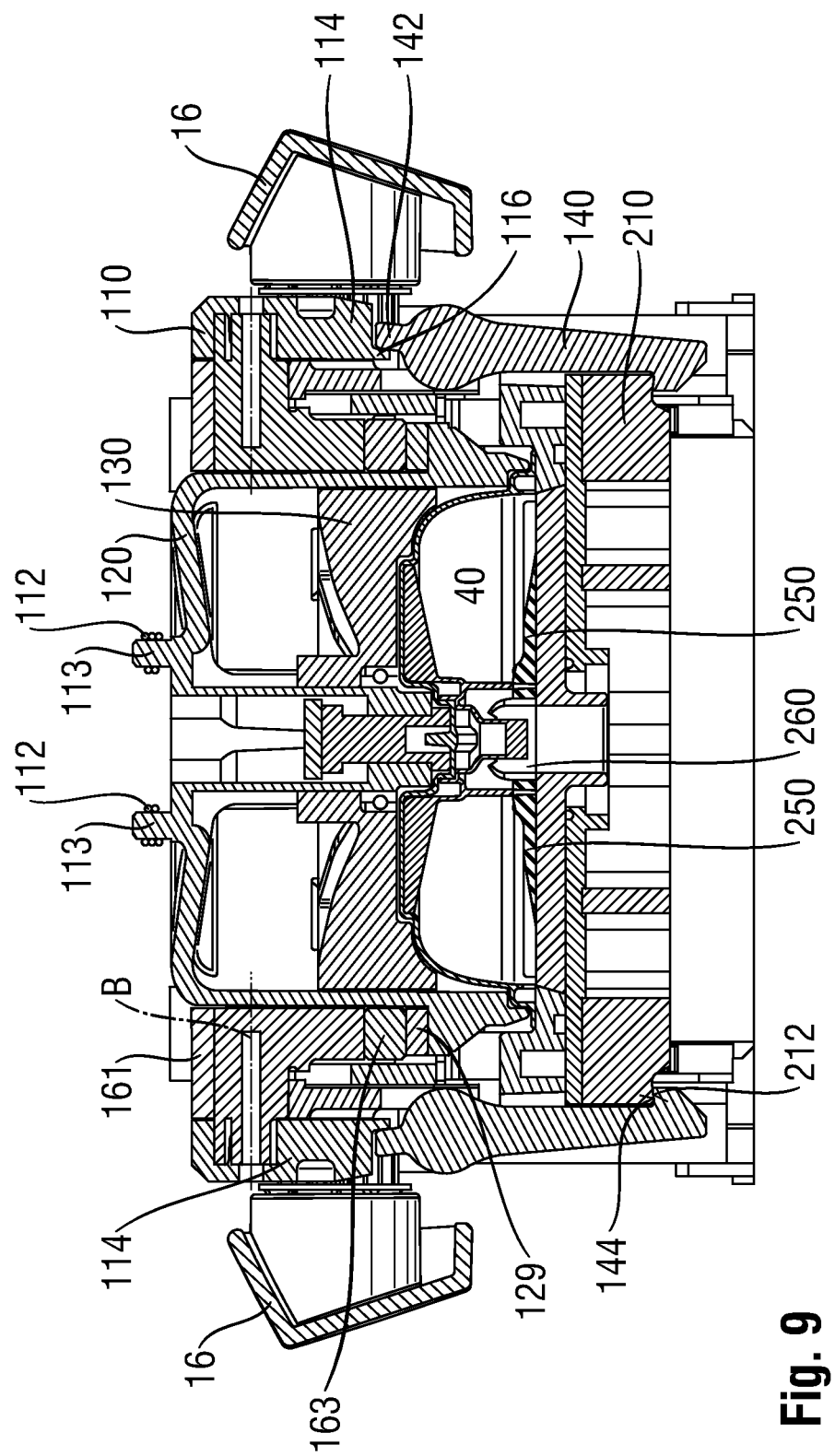
FIG. 9 shows a sectional view through the closed brewing head according to the second embodiment.

This situation is shown in FIG. 8b, which shows a section along the staggered section line D-D according to FIG. 8a for the first embodiment of the invention and FIG. 9 for the second. The operating lever 16 has a completely horizontal position and has therefore assumed its closing position. As a result it has moved the eccentric disk 161 (FIG. 8b) into an almost perpendicular position, in which it has moved the roller 163 into its lowest position. It therefore presses the brewing pot 120 to a maximum downward onto the ejector 220 by way of the plate 129. In this process the eccentric disk 161 moves the roller 163 out in a perpendicular manner below its axis of rotation B by way of a dead center point up to the height of the displacement axis D. A pressure force, which acts in a vertical direction upward on the brewing pot 120 during the brewing process and therefore in the opening direction, is transmitted by way of the plate 129 to the roller 163. Its position beyond the dead center point of the eccentric disk 161 means that it exercises a moment in the closing direction, in FIG. 8b counterclockwise on the eccentric disk 161, and not in the opposite opening direction. This ensures that the locking system of the brewing pot 120 cannot be released when subjected to a pressure that occurs during the preparation process.

FIG. 9 shows a closed brewing head 1 of the second embodiment in a sectional view similar to the one in FIG. 7b but with a small substrate capsule 40. The explanations given there and those for FIG. 8b can therefore be applied largely to FIG. 9.

The brewing chamber carriage 130 is lowered into its lower position in FIG. 9 because of the small substrate capsule 40, which it presses onto the piercer 260, thereby pressing the laminate 31 of the capsule 40 onto the seal 250. In contrast to FIG. 7b it is configured in the manner of a dish and extends over a majority of the lower face of the capsule 40.

Figure 10A:
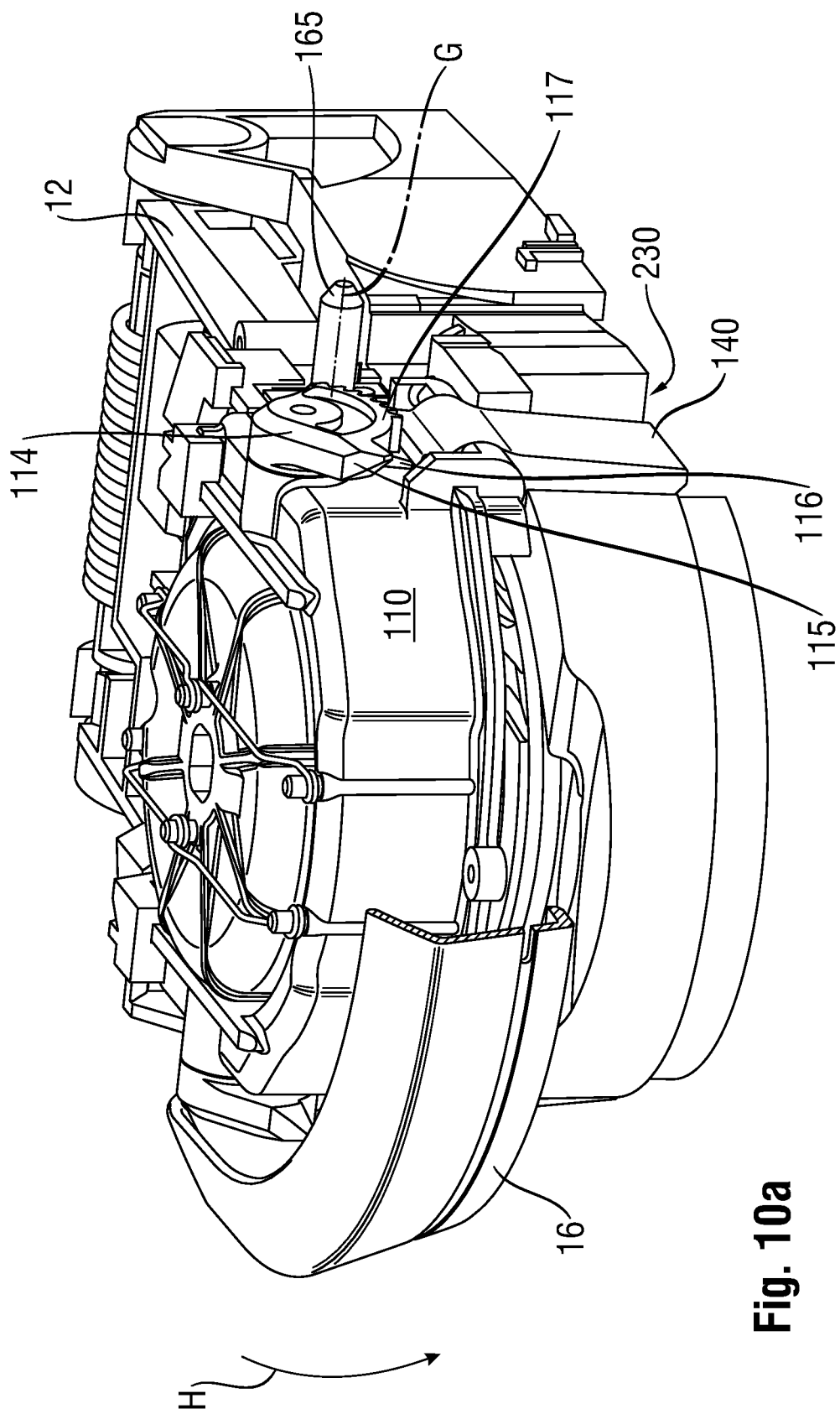
FIG. 10 shows perspective oblique views of the closed brewing head according to the second embodiment.
Figure 10B:
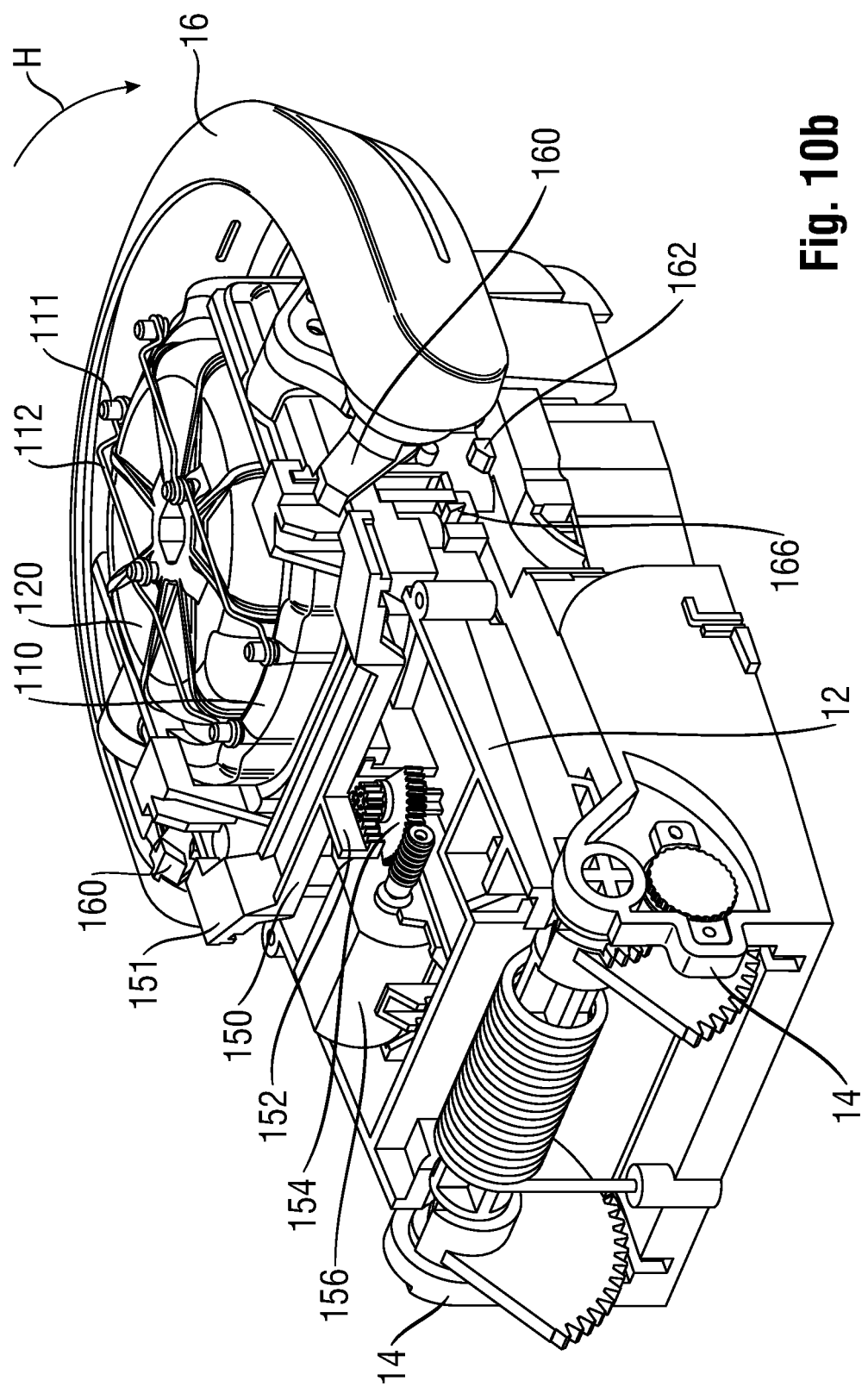
Figure 10C:
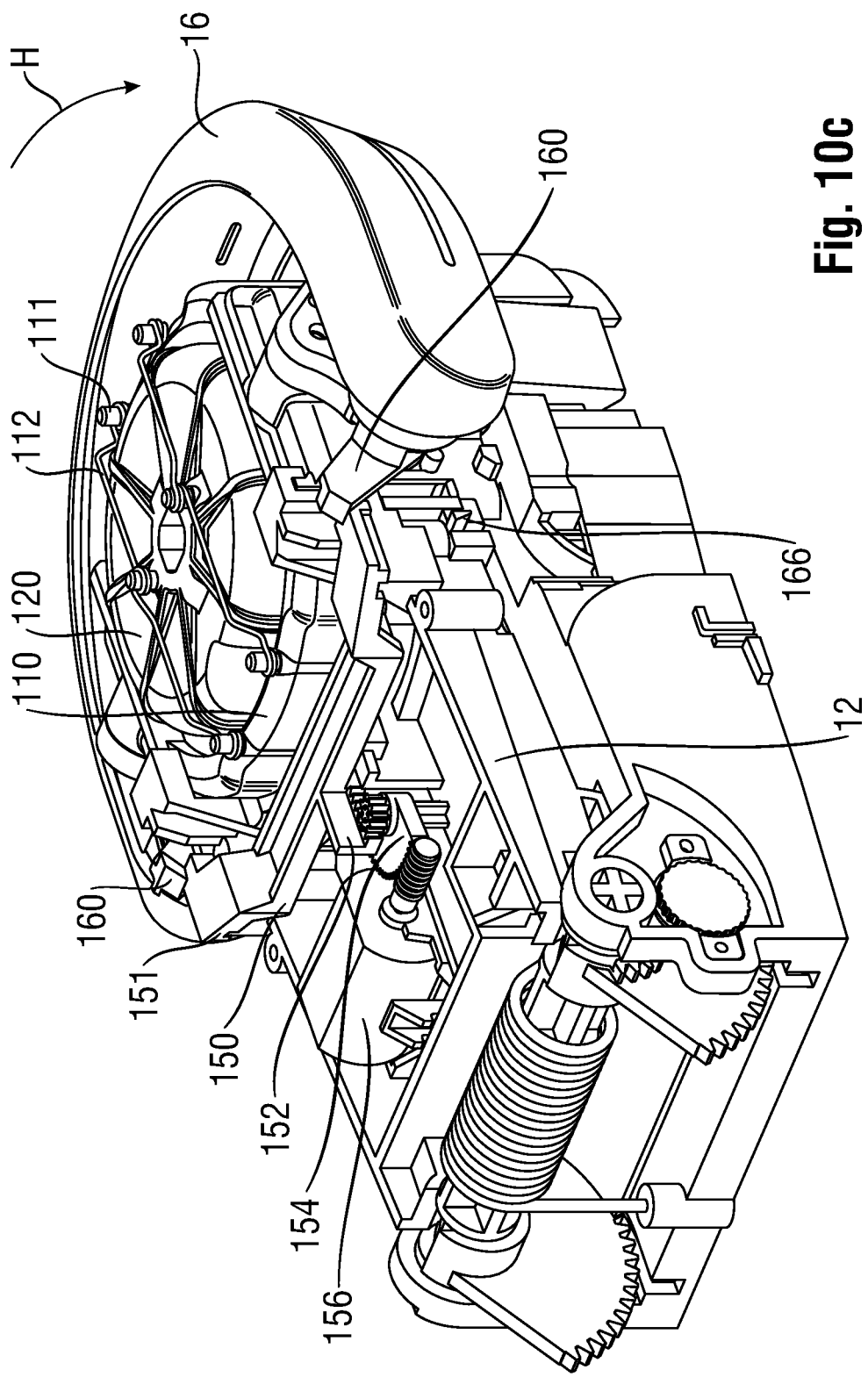

FIGS. 10a to c show perspective views of the closed position of the brewing head 1 and a last securing process. In FIG. 10a the right half of the operating lever 16 is omitted for clarity, so that its shaft 165 is evident, by way of which it pivots about its axis of rotation G. Also shown are teeth 117 on the control plate 114, which are used to transmit the pivot movement of the operating lever 116 to the control plate 114. Also shown is the second lug 116 on the control plate 114, which is positioned between the housing 110 and the shoulder 142 of the lever 140, blocking the latter's pivot movement from the hook recesses 230.

FIG. 10b shows a roughly opposite perspective view, in which the parts 150, 156 already shown in FIG. 2b but not explained can be seen in the brewing head arm.

The stop carriage 150, which can be displaced along the brewing head arm, extends in a transverse manner over the entire brewing head arm 12 and runs in two cropped wings 151. On its side away from the housing 110 a rack 152 projects in the extension direction of the brewing head arm 12 from the stop carriage 150. It engages in a transmission unit 154, which is coupled to an electric motor 156. Once the brewing head 1 is completely closed, a microswitch (not shown) is actuated, which activates the electric motor 156. By way of the transmission unit 154 it moves the stop carriage 150 toward the housing 110. In this process its wings 151 move below the spigots 160 of the operating lever 16. This state is shown in FIG. 10c. The operating lever 116 is thus blocked, because the spigots 160 can no longer be pivoted counter to the closing direction H, in other words in the opening direction. Inadvertent or forced opening of the operating lever 16 is therefore as good as impossible, once the microswitch is closed and the brewing process has been started.

As soon as the brewing process has been completed, the motor 156 receives the signal to move the stop carriage 150 back, so that the spigots 160 and with them the operating lever 16 can be pivoted counter to the closing direction H. This initiates the opening process for the brewing head 1, which in principle takes place in the reverse sequence to the closing process. Therefore the operating lever 16 first turns the eccentric disk 161 in the opening direction, in other words clockwise (FIG. 8b), by way of the control plate 114. This detensions the brewing pot 120 and its seal in relation to the ejector 220. In this process the spring clips 112, from which the brewing pot 120 is suspended by way of the pins 113, pull the brewing pot 120 down from the ejector 220 and upward in a displacement direction D. The detensioning of the seal allows any remaining residual pressure to escape from the brewing pot 120.

This process starts as soon as the operating lever 16 leaves its horizontal position. At this point in time the pre-locking facility is still activated, so that the pressure, which is now slowly being released, cannot suddenly force the brewing chamber upper part 10 open. Continuous detensioning of the seal 250 and progressive pressure reduction take place by way of the relatively long pivot path in the opening direction, in other words counter to the closing direction H. It has already been completed when the operating lever 16 approaches the perpendicular position. The second lug 116 (FIG. 10a) then releases the hooks 140, so that in principle they can be pivoted. However their spring pretensioning continues to hold them in the locked position. As the operating lever 16 is raised further, beyond the 80° position (see FIG. 1) against its spring pretensioning, the first lug 115 engages successively with the shoulder 142 and presses it progressively in one direction against the housing 110. In so doing it pivots the hook 140 out of the hook recess 230, thereby releasing the pre-locking system (FIG. 5a). Releasing the pre-locking system finally releases the upper brewing chamber part 10 and the lower brewing chamber part 20 from one another, so that the upper brewing chamber part 10 can pivot up to be available for a subsequent brewing process.

LIST OF REFERENCE CHARACTERS

1 Brewing head
10 Pivotable brewing chamber upper part
12 Brewing head arm
14 Support block
16 Actuation lever
20 Fixed brewing chamber lower part
30 Large substrate capsule
31 Laminate
32 Upper face
33 Blind hole
34 Indentation
40 Small substrate capsule
110 Housing
111 Pins on housing 110
112 Spring clip
113 Pins on brewing pot 120
114 Control plate
115 First lug
116 Second lug
117 Teeth
119 Seal
120 Brewing pot
121 Gap
122 Stop carriage
123 Stop lug
124 Control ring
125 Bevel
126 Leading surface
127 Casing
128 Inner surface
129 Plate
130 Brewing chamber carriage
131 Blocking surface
132 Centering pin
133 End face
134 Positioning pin
135 Upper face
140 Hook
142 Shoulder
144 Hook surfaces
150 Stop carriage
151 Wing
152 Rack
154 Transmission unit
156 Electric motor
160 Spigot on 16
161 Eccentric disk
162 Stop for 160
163 Roller
164 Spring pin
165 Shaft for 16
166 Triangular bolt
210 Frame
212 Frame surfaces
220 Ejector
230 Hook recess
240 Barcode reader
250 Seal
260 Piercer
A Pivot axis of brewing chamber upper part 10
B Pivot axis of control plate 114
C Pivot axis of hooks 140
D Displacement direction of brewing chamber carriage 130
E Displacement direction of spring pin 164
G Pivot axis of actuation lever 16
H Closing direction of actuation lever 16

The invention claimed is:

1. A brewing head of a hot beverage machine, comprising:
a fixed brewing chamber part;
a movable brewing chamber part movable in relation to the fixed brewing chamber part to define a brewing chamber for receiving a substrate capsule;
a locking system for closing the fixed and movable brewing chamber parts to form the brewing chamber; and
a seal for pressure-tight sealing of one of the two brewing chamber parts and the substrate capsule during beverage preparation, wherein the brewing chambers has three operating positions comprised of an opening position for loading the brewing chamber, a partially closed position in which the brewing chamber is closed and the seal is detensioned, and a closed position in which the brewing chamber is likewise closed and the seal is tensioned; and
the locking system including a pre-locking facility for locking the fixed and movable brewing chamber parts together in the partially closed position.

2. The brewing head of claim 1, wherein the pre-locking facility has a hook which is positioned on one of the fixed and movable brewing chamber parts and constructed to hook to the other one of the fixed and movable brewing chamber parts.

3. The brewing head of claim 2, wherein the hook of the pre-locking facility is pretensioned.

4. The brewing head of claim 1, further comprising a stop which blocks a movement of the brewing chamber into the closed position when the pre-locking facility is unlocked.

5. The brewing head of claim 1, further comprising a brewing chamber pot provided in one of the fixed and movable brewing chamber parts, said brewing chamber pot being movable along an axis between an opening position and a closed position.

6. The brewing head of claim 1, further comprising a brewing chamber carriage arranged within the movable brewing chamber part for executing two closing and stop positions.

7. The brewing head of claim 1, further comprising an actuation lever for opening and closing the brewing chamber and for actuating the pre-locking facility.

8. The brewing head of claim 7, further comprising a brewing chamber pot provided in one of the fixed and movable brewing chamber parts, said brewing chamber pot being movable along an axis between an opening position and a closed position, wherein the actuation lever is configured to move the brewing chamber pot.

9. The brewing head of claim 8, further comprising a mechanical coupling disposed between the actuation lever, the pre-locking facility and the brewing chamber pot, said mechanical coupling being constructed such that the brewing chamber pot is movable or stoppable only after actuation of the pre-locking facility.

10. The brewing head of claim 9, further comprising a blocking element which blocks a pivoting of the actuation lever until the movable brewing chamber part rests on the fixed brewing chamber part.

11. The brewing head of claim 1, further comprising a brewing chamber carriage arranged within the movable brewing chamber part for executing two closing and stop positions, wherein the actuation lever is configured to move the brewing chamber carriage.

12. A hot beverage machine comprising:
a brewing head including a fixed brewing chamber part, a movable brewing chamber part movable in relation to the fixed brewing chamber part to define a brewing chamber for receiving a substrate capsule, a locking system for closing the fixed and movable brewing chamber parts to form the brewing chamber, and a seal for pressure-tight sealing of one of the two brewing chamber parts and the substrate capsule during beverage preparation, wherein the brewing chambers has three operating positions comprised of an opening position for loading the brewing chamber, a partially closed position in which the brewing chamber is closed and the seal is detensioned, and a closed position in which the brewing chamber is likewise closed and the seal is tensioned; and
the locking system including a pre-locking facility for locking the fixed and movable brewing chamber parts together in the partially closed position.

13. The hot beverage machine of claim 12, wherein the pre-locking facility has a hook which is positioned on one of the fixed and movable brewing chamber parts and constructed to hook to the other one of the fixed and movable brewing chamber parts.

14. The hot beverage machine of claim 13, wherein the hook of the pre-locking facility is pretensioned.

15. The hot beverage machine of claim 12, wherein the brewing head includes a stop which blocks a movement of the brewing chamber into the closed position when the pre-locking facility is unlocked.

16. The hot beverage machine of claim 12, wherein the brewing head includes a brewing chamber pot provided in one of the fixed and movable brewing chamber parts, said brewing chamber pot being movable along an axis between an opening position and a closed position.

17. The hot beverage machine of claim 12, wherein the brewing head includes a brewing chamber carriage arranged within the movable brewing chamber part for executing two closing and stop positions.

18. The hot beverage machine of claim 12, wherein the brewing head includes an actuation lever for opening and closing the brewing chamber and for actuating the pre-locking facility.

19. The hot beverage machine of claim 18, wherein the brewing head includes a brewing chamber pot provided in one of the fixed and movable brewing chamber parts, said brewing chamber pot being movable along an axis between an opening position and a closed position, wherein the actuation lever is configured to move the brewing chamber pot.

20. The hot beverage machine of claim 19, further comprising a mechanical coupling disposed between the actuation lever, the pre-locking facility and the brewing chamber pot, said mechanical coupling being constructed such that the brewing chamber pot is movable or stoppable only after actuation of the pre-locking facility.

21. The hot beverage machine of claim 20, wherein the brewing head includes a blocking element which blocks a pivoting of the actuation lever until the movable brewing chamber part rests on the fixed brewing chamber part.

22. The hot beverage machine of claim 12, wherein the brewing head includes a brewing chamber carriage arranged within the movable brewing chamber part for executing two closing and stop positions, wherein the actuation lever is configured to move the brewing chamber carriage.

23. An actuation method for activating a hot beverage machine, comprising:
a) inserting a fresh substrate capsule into a brewing chamber;
b) closing the brewing chamber;
c) activating a pre-locking system of the brewing chamber and locking fixed and movable brewing chamber parts together in a partially closed position in which a seal for pressure-tight sealing of one of the fixed and movable brewing chamber parts and the substrate capsule during beverage preparation is detensioned,
d) activating a locking system of the brewing chamber.

24. An actuation method for opening a brewing chamber of a hot beverage machine, comprising:
a) releasing a preparation pressure from the brewing chamber, when closed, by releasing a locking system;
b) releasing the brewing chamber by releasing a pre-locking system; and
c) opening the brewing chamber to remove a used substrate capsule.

25. The method of claim 24, further comprising inserting a fresh substrate capsule into the open brewing chamber.

26. The method of claim 24, further comprising mechanically ejecting the used substrate capsule, when the brewing chamber is open.

* * * * *